(12) United States Patent
Shankar

(10) Patent No.: US 11,262,798 B2
(45) Date of Patent: Mar. 1, 2022

(54) WEARABLE ELECTRONIC DEVICE

(71) Applicant: Lazy Design Private Limited, Pune (IN)

(72) Inventor: Apoorv Shankar, Pune (IN)

(73) Assignee: Lazy Design Private Limited, Pune (IN)

( * ) Notice: Subject to any disclaimer, the term of this patent is extended or adjusted under 35 U.S.C. 154(b) by 0 days.

(21) Appl. No.: 16/756,559

(22) PCT Filed: Oct. 24, 2018

(86) PCT No.: PCT/IB2018/058295
§ 371 (c)(1),
(2) Date: Apr. 16, 2020

(87) PCT Pub. No.: WO2019/082095
PCT Pub. Date: May 2, 2019

(65) Prior Publication Data
US 2021/0200262 A1     Jul. 1, 2021

(30) Foreign Application Priority Data
Oct. 25, 2017   (IN) .............................. 201721037853

(51) Int. Cl.
*G06F 1/16*     (2006.01)
*G06F 3/16*     (2006.01)
(52) U.S. Cl.
CPC ............ *G06F 1/163* (2013.01); *G06F 1/1671* (2013.01); *G06F 3/167* (2013.01); *G06F 2200/1636* (2013.01)

(58) Field of Classification Search
CPC ........ G06F 1/163; G06F 1/1671; G06F 3/167; G06F 2200/1636; G06F 3/014;
(Continued)

(56) References Cited

U.S. PATENT DOCUMENTS 8,605,036 B1 * 12/2013 Kelly .................. G06F 3/03547
345/169
D869,318 S * 12/2019 Bereshchanskiy ........ D10/104.1
(Continued)

FOREIGN PATENT DOCUMENTS

CN          207819897 U   *  9/2018
EP            3291045 A1  *  3/2018   .......... H04M 1/0235
(Continued)

OTHER PUBLICATIONS

Takanashi, Translation of JP 2002091697, Mar. 29, 2002 (Year: 2002).*
(Continued)

*Primary Examiner* — Dmitriy Bolotin
(74) *Attorney, Agent, or Firm* — Dorsey & Whitney LLP

(57) ABSTRACT

A wearable ring-shaped electronic device having a ring portion engageable with a first finger of a user wearing the device is provided. The ring portion includes an interface, and a display unit operatively coupled with the ring portion. The display unit comprising a face that is coupled with any or a combination of a face cover and a face edge such that, upon interaction between a second finger of the user and the interface, interaction-based data is transmitted to and processed by at least one processor of the device so as to enable one or more notifications to be either displayed on any or a combination of the face cover and the face edge, or audibly notified to the user.

25 Claims, 19 Drawing Sheets

(58) Field of Classification Search
CPC ........ G06F 21/31; G06F 3/0346; G06F 3/017;
G06F 3/016; G06F 3/0233; G06F 3/0416;
G06F 3/04883; G06F 1/1643; G06F
2203/0381
See application file for complete search history.

(56) References Cited

U.S. PATENT DOCUMENTS

| | | | | |
|---|---|---|---|---|
| 2002/0009972 | A1* | 1/2002 | Amento | G06F 3/017 |
| | | | | 455/66.1 |
| 2008/0182547 | A1* | 7/2008 | Glover | H04M 11/04 |
| | | | | 455/404.1 |
| 2012/0306771 | A1* | 12/2012 | Chen | G06F 3/04182 |
| | | | | 345/173 |
| 2013/0127980 | A1* | 5/2013 | Haddick | G02B 27/0093 |
| | | | | 348/14.08 |
| 2014/0028606 | A1* | 1/2014 | Giannetta | G06F 3/04886 |
| | | | | 345/174 |
| 2015/0062086 | A1* | 3/2015 | Nattukallingal | G06F 3/016 |
| | | | | 345/175 |
| 2015/0065090 | A1* | 3/2015 | Yeh | G06F 1/163 |
| | | | | 455/411 |
| 2015/0277559 | A1* | 10/2015 | Vescovi | G06F 3/016 |
| | | | | 345/173 |
| 2015/0373443 | A1* | 12/2015 | Carroll | H04M 1/0266 |
| | | | | 381/364 |
| 2016/0292563 | A1* | 10/2016 | Park | G06F 3/04883 |
| 2018/0052428 | A1* | 2/2018 | Abramov | G04B 47/00 |

FOREIGN PATENT DOCUMENTS

| | | | | |
|---|---|---|---|---|
| JP | 2002091697 | A | * 3/2002 | |
| WO | 2016168097 | A1 | 10/2016 | |
| WO | WO-2016168097 | A1 | * 10/2016 | G04B 47/00 |
| WO | WO-2017018908 | A1 | * 2/2017 | A44C 9/00 |
| WO | WO-2018190747 | A1 | * 10/2018 | H04M 19/04 |
| WO | WO-2018190748 | A1 | * 10/2018 | G08B 25/10 |

OTHER PUBLICATIONS

International Search Report from International Application No. PCT/IB2018/058295 dated Jan. 25, 2019.

* cited by examiner

WEARABLE ELECTRONIC DEVICE

FIELD OF THE INVENTION

The present invention mainly relates to an electronic wearable device and more particularly to a smart electronic wearable device which is faster and more efficient human machine interface than a touchscreen smartphone touchscreens/interfaces and Voice based interfaces to control regular tasks of user.

BACKGROUND OF THE INVENTION

Wearable electronic devices are well known in the art which includes smart watches, smart glasses, and the like. Such devices may be paired with a primary device (e.g., smart phones, processor computers, or other network connectable electronic devices), for communication with the primary device, or with other network devices through the primary device.

Nowadays, the emergency/crime situations and scenarios often arise in roads, grounds, working place, and other private as well as public places. These emergency situations and scenarios are controlled by local emergency service providers such as police, ambulance, fire stations, blood bank, etc. Emergency telephone numbers are meant to be used by a caller in need of urgent assistance and differ from region to region, but are often one or more short number sequences, such as 101, 108, etc. that can be easily recalled and dialed quickly. But, still problems exist as calling emergency services would take about 3-4 steps and 10-15 seconds to notify the police/medics of the emergency.

To solve the above mentioned limitations, the electronic wearable device has been introduced. In an example, a smart watch may be a wearable electronic device configured to be worn on a wrist of a user. During emergency situations such as medical, physical abuse, sexual abuse, kidnapping, robbery etc. where an individual may not have easy access to a mobile electronic device, it is very important to have an emergency device which gives users the ability to communicate with or notify any other person to seek help independent of the present circumstances and position. A smart watch can help the user to intimate about the emergency situation to the nearby police station, ambulance, fire stations, blood bank, relatives, friends and etc. by pressing the button of the smart watch (5-10 seconds).

But, the a problem still persists, as the smart watch is worn on the wrist of one hand, a second hand is required to interact with a user interface of the smart watch, for user input. Accordingly, it may be inconvenient for a user to interact with the smart watch when the second hand is preoccupied.

Nowadays, people are interacting with machines with various interfaces like Push buttons for machines, steering wheel for cars, Levers, Rotary switches, Touchscreens for phones, touchscreen for smart watches and recent developments in Natural Language processing has enabled us to witness Voice Based interfaces with devices like Amazon Echo and Google Home in addition to Voice assistants like Ski, Cortana and Google assistant. The voice based interfaces require a person to speak a complete sentence that should make sense as per the algorithm used by the voice search engine to get the required task done. With regular usage of such interfaces to get tasks done, the user may get irritated eventually to say the same sentence repetitively to get a regular or obvious task done. The primary purpose of a good interface is to design a medium that interacts with humans in the most efficient way minimizing confusion and time to take action, and giving appropriate feedback for the action taken.

The problem with the existing technology and products in this domain is that these devices do not act as the fastest way to get a particular task done through a machine, also, the mechanical energy expended by the user to complete such tasks is not less enough which affects the overall user experience of using the product, for example using a phone's touchscreen to call a person requires the following steps; Taking phone out of pocket, unlocking the phone, opening Phone call app, selecting contact, taking phone in the hand near the ear and talk. Thus, there are multiple unnecessary steps involved in a basic task like making a phone call which takes both great time and energy of the user.

Another interface for handling such tasks is explained in patent US 20150277559A1 titled "Devices and Methods for a Ring Computing Device" which uses a touchscreen interface on the ring. Although here, user can use one hand instead of both, having a touch based display on a small product like a ring is not very user friendly as the size of the screen is almost as big as that of a fingertip of an adult user. Also, the interface in discussion talks about controlling devices and screens without any component of data analytics and it does not discuss how it can control multiple devices at once still staying as a faster medium of getting the required tasks done.

Presently available wearable electronic devices fail due to requiring two hands to operate, short battery life due to rich display, limited input, limited output, substantial sizes, and the like. Furthermore, some wearable electronic devices are provided with a limited input area or other limited input capabilities, thus limiting the number of operations or motions the user could perform for input. For example, the user may be limited to using fingers of one hand (the second hand) to interact with the smart electronic device on the user's first hand.

In addition to this, to check notifications about various activities of interest to the user, the user needs to take the phone out from the pocket or from handbag and, if the user wears a smart watch, the user can rotate his/her wrist such that the display of the watch comes in view of the user's eyes and the user can see the notification on the display of the watch. The two cases discussed above require the user to make some unnecessary movements that can be avoided so as to get notified of various notifications from connected devices more easily.

Further, Voice based Human Machine Interfaces (HMIs), like smart speakers, is placed at a particular place in the home and requires the user to speak loud to get something done, preferably, through voice commands, and also, it takes time to do everyday tasks through voice commands as saying the complete sentence for usual/obvious tasks take time. Also, these smart speakers are meant to be kept at home and the user has to rely on his Smartphone's touchscreen or Smartphone's voice assistant to get tasks done when the user is not at home which again requires multiple steps to be used and is not as efficient.

Therefore, there is a need in the art with a smart electronic wearable device which is faster and more efficient human machine interface than a smartphone touchscreen and existing Voice based interfaces to control regular tasks of user and to solve the above mentioned limitations.

SUMMARY OF THE INVENTION

Aspects of the present invention relates to a smart electronic wearable device which is faster and more efficient human machine interface than a touchscreen smartphone touchscreen/interface and Voice based interfaces to control regular tasks of user.

An aspect of the present invention is to address at least the above-mentioned problems and/or disadvantages and to provide at least the advantages described below.

A main objective of the present invention is to provide a faster and more efficient human machine interface than a smartphone touchscreen and Voice based interfaces that allows the user to interact with connected devices and services that user uses in day to day activities.

Accordingly, in one aspect of the present invention relates to a wearable ring-shaped electronic device. The device includes a ring portion (band) having a ring shape that forms a holding space for a user's finger to wear, a display module with a face, face cover and a face edge, fixed to the ring portion to display notifications. The face is preferably provided in the front casing of the display module of ring, wherein all circuitry and PCB including Speaker, Microphone, Vibrational unit, Wireless antenna, microcontroller, and power source are positioned inside face. The face cover is the cover of the face, where the face cover also acts as a screen to display notifications and data about predicted shortcuts on the ring. The face cover extends towards to the sides or edge of the face and thus extending the display to the edge.

The device also includes a touch slider interface module configured in the ring portion to sense a movement from the user's finger. The touch slider interface module with touch sensor is coupled to a microcontroller chip embedded on a PCB inside the face part of the ring which reads the input from this touch sensor and activates a particular action only when the sensor senses that the user has slid his/her finger over the touch interface module/sensor.

The device also includes a sound control module, fixed to the ring portion for enabling voice assistant. The device takes input from the user to perform a particular action and a central processing module (microcontroller), fixed to the ring portion and coupled to the touch slider interface module and sound control module, generates a control command and perform a corresponding assigned function according to the slider movement of user over the touch interface module/sensor and by speaking.

Another aspect of the present invention relates to a wearable ring-shaped electronic device having a ring portion engageable with a first finger of a user wearing the device, the ring portion comprising an interface, and a display unit operatively coupled with the ring portion. The display unit comprising a face that is coupled with any or a combination of a face cover and a face edge such that, upon interaction between a second finger of the user and the interface, interaction-based data is transmitted to and processed by at least one processor of the device so as to enable one or more notifications to be either displayed on any or a combination of the face cover and the face edge, or audibly notified to the user.

In an aspect, the face is configured as casing of the display unit, and comprises any or a combination of a speaker, a microphone, a vibrational unit, a wireless antenna, a microcontroller, the at least one processor, and a power source.

In an aspect, the face cover comprises a digital display screen to display at least a set of the one or more notifications.

In an aspect, the interface is a touch slider interface that is operatively coupled with a touch sensor that senses movement of the second finger on the touch slider interface to generate a signal that is transmitted for processing to the at least one processor, and detect an action that is to be performed corresponding to the signal.

In an aspect, the ring portion further comprises a sound control unit, which when actuated, enables the device to receive an audio signal from the user, and transmit the audio signal to the at least one processor to enable a set of the one or more notifications to be issued to any or a combination of the face cover and the face edge.

In an aspect, a set of the one or more notifications comprise execution of a configured function.

In an aspect, the at least one processor transmits the one or more notifications based on a combination of processing of the interaction-based data received from the interface, and user contextual parameters that are selected from any or a combination of time of the interaction, date of the interaction, manner of the interaction, user finger that is used as the second finger, history of calibration performed by the user for the interaction, location of the user during interaction, and frequency of the interaction.

In an aspect, the device is operatively coupled with a learning engine, that may be comprised in the mobile phone, operatively coupled with the at least one processor, the learning engine being configured to: learn from any or a combination of subsequent interactions between the user and the one or more notifications displayed to the user, and user interactions on a mobile phone operatively coupled with the device; and relay feedback extracted from the learning to the at least one processor, based on which the at least one processor issues future notifications. In another aspect, the learning may also happen without the user interacting with the ring, by learning patterns of user actions on the mobile phone.

In an aspect, the ring portion comprises a feedback projection to enable tactile feedback to be given to the user when the user moves a second finger over the touch interface area of the ring.

In an aspect, the interaction-based data is generated based on the motion of the fingers, in which at least one finger has the ring, received from the user as part of the interaction.

In an aspect, the face edge enables the user to perceive a set of the one or more notifications when users' hand is kept in relaxed position.

In an aspect, the ring portion further comprises a motion sensing unit configured to assess interaction of the second finger with the ring so as to detect gestures made by the second finger, the detected gestures being sent as part of the interaction-based data to the at least one processor.

In an aspect, the device is operatively coupled with a motion sensor that senses direction and intensity of micromotions of swiping the second finger on a portion of the first finger, based on which at least a part of the interaction-based data is generated is sent to the at least one processor.

In an aspect, the portion of the first finger is the tip of the first finger.

In an aspect, the interaction comprises sliding of the second finger over the interface.

In an aspect, the at least one processor is operatively coupled with a second processor in a manner such that at least a part of the interaction-based data is processed at the second processor so as to enable generation of the one or more notifications. In another aspect, the second processor is configured in a mobile phone. In yet another aspect, the second processor is a remote processor configured in cloud.

In an aspect, the face cover makes a curve at one edge of the face, the curve being representative of the face edge.

In an aspect, the face edge is used to display a portion of the one or more notifications.

In an aspect, another interface is a planar joystick, the planar joystick comprising one or more of slider buttons, each of the one or more slider buttons, upon being actuated and interacted with, generate at least a portion of the interaction-based data.

In an aspect, the one or more slider buttons (B) interact and operate with one or more magnets (M) and at least one lock (L) so as to actuate the respective slider button and enable generation of the at least portion of the interaction-based data In an aspect, actuation of the plurality of slider buttons is performed through physical displacement of the respective slider button.

In an aspect, the mechanical slider interface further comprises at least one magnetic sensor operatively coupled with the one or more magnets so as to generate and transmit the at least portion of the interaction-based data to the at least one processed based on orientation of the one or more magnets.

In an aspect, the face is the display unit, and wherein the ring portion comprises any or a combination of a speaker, a microphone, a vibrational unit, a wireless antenna, a microcontroller, the at least one processor, and a power source.

In an aspect, the interface (106) is configured to control one or more electronic devices Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE ACCOMPANYING DRAWINGS

The above and other aspects, features, and advantages of certain exemplary embodiments of the present invention will be more apparent from the following description taken in conjunction with the accompanying drawings in which.

Figure 1:
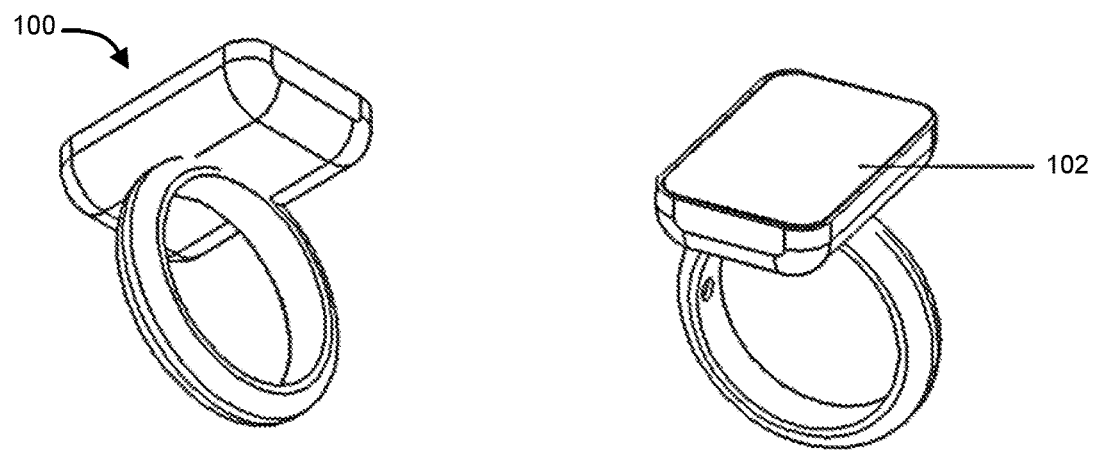
FIG. 1 shows a wearable ring-shaped electronic device showing a planar face cover according to one embodiment of the present invention.

FIGS. 29A-D shows an exemplary implementation of a fingertip interaction for motion only between Index finger and Thumb using the ring.

Persons skilled in the art will appreciate that elements in the figures are illustrated for simplicity and clarity and may have not been drawn to scale. For example, the dimensions of some of the elements in the figure may be exaggerated relative to other elements to help to improve understanding of various exemplary embodiments of the present invention.

DETAILED DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic is intended to provide.

FIGS. 1 through 29, discussed below, and the various embodiments used to describe the principles of the present invention in this patent document are by way of illustration only and should not be construed in any way that would limit the scope of the invention. Those skilled in the art will understand that the principles of the present invention may be implemented in any suitably arranged communications system. The terms used to describe various embodiments are exemplary. It should be understood that these are provided to merely aid the understanding of the description, and that their use and definitions, in no way limit the scope of the invention. Terms first, second, and the like are used to differentiate between objects having the same terminology and are in no way intended to represent a chronological order, unless where explicitly stated otherwise. A set is defined as a non-empty set including at least one element.

The present invention relates to an artificial intelligence based wireless wearable human machine interface in the form of a ring to be worn on a finger consisting of a touch based surface that gets activated by sliding another finger over it. The wearable device predicts what the user might want next and assigns that shortcut on the ring's interface. The wearable uses a combination of vibrational and tactile feedback for the action taken by the user.

An aspect of the present invention relates to a wearable electronic device that includes a ring portion (band), having a ring shape that forms a holding space for a user's finger to wear, the ring portion including a touch slider interface module. The touch slider interface module has a touch sensor configured to sense one or more movements from the user's finger. The wearable electronic device also includes a display module including a face, a face cover and a face edge, fixed to the ring portion to display notifications. The face is the front casing of the display module of the ring, the face cover acts as a screen to display notification and the face cover extends towards of the sides or edge of the face, thus extending the display to the edge. The display module can further include a plurality of modules and a processor having a memory.

In an aspect, during an operational movement of the finger by the user, the touch sensor is capable of sensing the movement of the finger and reads the same as input and enables the processor to activate one or more module to perform a corresponding assigned function according to the slider movement of the user over the touch interface.

In an aspect, the wearable electronic device also includes a voice control module configured to the processor, the voice control module receives voice command as input and enables the processor to activate one or more module to perform a corresponding assigned pre-defined function.

In an aspect, the face of the display module includes all circuitry and PCB having speaker, microphone, vibrational unit, wireless antenna, microcontroller, power source which all are positioned inside the face.

In an aspect, the face edge of the display module (face edge) facilitate the user to perceive the notifications visually, when the hand is kept in the relaxed position.

In an aspect, the touch slider interface is a planar joystick which comprises of slider button B1, B2, B3, surface plate S1, S2, S3, magnets M1, M2, hall Sensors H1, H2, H3, H4, and lock L. In another aspect, B1 is the upper part of the slider button which encloses magnet M1, B2 is the mid-section of the slider button which encloses M1, the diameter of B2 is such that the lock L fits around it and restricts motion in the plane complementary the plane of lock L, B3 is the bottommost part of the slider button that encloses M1. In yet another aspect, surface plate S1 is the outer body of the band part of the ring, B1 comes out through the orifice made in S1 for the slider interface housing, S2 is the plate/surface that separates the two Magnets M1 and M2, S3 is the bottommost part of the slider interface housing and it is the surface/plate over which M2 and all Hall sensors to sense motion or position of M1 relative to M2.

In yet another aspect, H1-H4 are the hall sensors placed parallel to the plane of the lock L over Surface S3, these sensors sense the position of the Magnet M1 which gives the position of the Slider button, the sensors are electrically connected to a microcontroller circuit that processes these signals from hall sensors and act accordingly. In yet another aspect, L is the lock which locks the position of Magnetic button assembly for M1 inside the Band/Interface Housing so the slider button B1 does not fall off from the housing and it is free to rotate in its plane about the centre of the neutral position of magnets or the neutral axis in between the space of S1 and S2.

In yet another aspect, the button B1 is slid by a user's finger over a second magnet M2 whose position of fixed so as to keep the neutral position of M1 at the centre of the device due to magnetic attraction between M1 and M2. In still another aspect, In an aspect, the sliding motion of M1 with respect to M2 distorts the magnetic flux which is detected by a plurality of magnetic sensors placed in the plane of M2 via H1, H2, H3 and H4, this data of detected motion from Magnetic sensors is sent to a microcontroller for further processing.

In an aspect, the wearable electronic device also includes tactile feedback projections, where the tactile feedback projections are made over the touch surface on the band which provides a tactile feedback to the user on moving the finger over the touch slider interface module.

In an aspect, the wearable electronic device also includes a texture having embossed patterns which have different heights and density at different locations of the touch surface indicating the four directions up, down, left, right on this surface to facilitate the user in sliding his/her finger or thumb in the right direction over the touch surface.

In an aspect, the microcontroller transmits the data wirelessly to an external computing device, where the processing happens in this computing device and based on multiple data points like the user's location, time of day, event saved in the calendar, phone sensor data, etc., the computing device takes a specific action that may activate/deactivate or modify configuration of any connected device or service, simultaneously giving an output to the wearable ring-shaped electronic device wirelessly that acts as feedback for the action that just got completed, this feedback can be voice, haptic or light based.

In an aspect, the wearable electronic device also includes a Bone Conduction Speaker module which acts as an additional feedback for voice commands and lets the user take phone calls through the ring.

In an aspect, the wearable electronic device also includes directional speakers that are made from ultrasonic piezo elements which are capable of giving a sound focused in a particular direction like a laser beam, when the user points his/her finger towards the ear, he/she can hear the sound coming from the ring.

In an aspect, the wearable electronic device also includes a motion sensing module which is used to analyse activity of the finger and detect gestures made by the finger.

In an aspect, the microcontroller transmits the data wirelessly to a remote computing device directly or indirectly, where the processing happens in this remote computing device and based on multiple data points like the user's location, time of day, event saved in the calendar, phone sensor data, etc., the remote computing device takes a specific action that may activate/deactivate or modify configuration of any connected device or service, simultaneously giving a direct or indirect output to the wearable ring-shaped electronic device wirelessly that acts as feedback for the action that just got completed, this feedback can be voice, haptic or light based.

Embodiments of the present invention mainly relates to the minimization of time and energy used to interact with connected devices and services which a person uses regularly, in other words, being a medium of interaction, the invention acts as a window to a user's connected life. For example, this invention becomes an emergency button shortcut when the user is in danger, it acts as an easier way to take phone calls and makes a person more efficient by minimizing time taken in interacting with regular connected devices and services.

Working Example: A woman is walking down the road to some place at 12 AM at a place which is known to be dangerous. Suppose a person comes and tries to rob, kill or sexually assault the woman at this time. If she is wearing the invention, the ring, as soon as she slides her finger over the sliding touch interface more than 3 times in less than 2 seconds and the application/software on the phone is either programmed to or predicts that the user might be in danger because of various data points, and makes a phone call to the police and sends details about the woman's GPS location through SMS and the police takes further action by deploying PCR's/drones to the particular location before any mishap occurs.

Apart from this, according to the location data, time and many other variables, the ring will predict what the woman wants to do at that time and assign shortcuts to the same slider direction. For example, if she slides the touch slider up once, a cab heading for her home is booked at her current location. In another example, this same shortcut can be used to book a cab that may be visible on the rings display.

In an embodiment, a wearable ring-shaped electronic device (100) having a ring portion (110) engageable with a first finger (120) of a user wearing the device is provided. The ring portion (110) includes an interface (106), and a display unit (114) operatively coupled with the ring portion (110). The display unit (114) comprising a face (108) that is coupled with any or a combination of a face cover (102) and a face edge (106) such that, upon interaction between a second finger (118) of the user and the interface (106), interaction-based data is transmitted to and processed by at least one processor (112) of the device so as to enable one or more notifications to be either displayed on any or a combination of the face cover and the face edge (116), or audibly notified to the user.

FIG. 1 shows a wearable ring-shaped electronic device showing a planar face cover according to one embodiment of the present invention.

The FIG. 1 shows a wearable ring-shaped electronic device. The present invention relates to the field of HMI (Human Machine Interaction)/HCI (Human-computer interaction). The present invention product is in the form of a ring to be worn on the user's finger. The wearable ring shaped electronic device comprises: a ring portion (band), having a ring shape that forms a holding space for a user's finger to wear, the ring portion including a touch slider interface module, the touch slider interface module having a touch sensor configured to sense one or more movements from the user's finger, a display module including a face, a face cover and a face edge, fixed to the ring portion to display notifications, wherein the face is the front casing of the display module of the ring, the face cover acts as a screen to display notification and the face cover extends towards of the sides or edge of the face, thus extending the display to the edge, the display module further including a plurality of modules and a processor having a memory, wherein, during an operational movement of the finger by the user, the touch sensor is capable of sensing the movement of the finger and reads the same as input and enables the processor to activate one or more module to perform a corresponding assigned function according to the slider movement of the user over the touch interface. The ring further comprises a voice control module configured to the processor, the voice control module receives voice command as input and enables the processor to activate one or more module to perform a corresponding assigned pre-defined function. The face of the display module includes all circuitry and PCB having speaker, microphone, vibrational unit, wireless antenna, microcontroller, power source which all are positioned inside the face. The face edge of the display module (face edge) facilitates the user to perceive the notifications, when the hand is kept in the relaxed position. The ring further comprises a motion sensing module which is used to analyse activity of the finger and detect gestures made by the finger.

Figure 2:
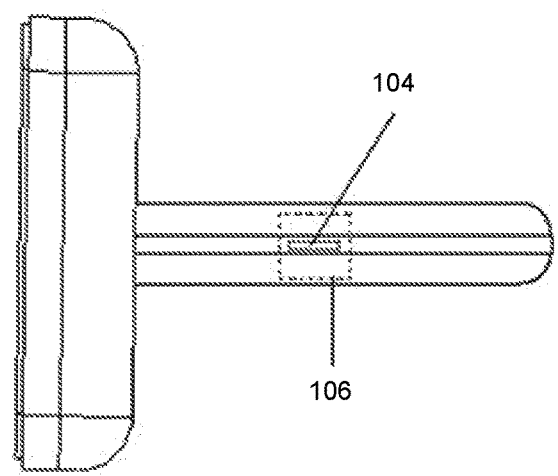
FIG. 2 shows a side View of the ring with the touch sensitive surface is indicated by the dotted line according to one embodiment of the present invention.

FIG. 2 shows a side view of the ring with the touch sensitive surface is indicated by the dotted line according to one embodiment of the present invention.

The FIG. 2 shows a side view of the ring with the touch sensitive surface is indicated by the dotted line. The product (wearable ring shaped electronic device) features an touch sensor that converts a small part of the band's surface to a touch sensitive surface (as shown in FIG. 2), this touch sensor is connected to a microcontroller chip embedded on a PCB inside the face part of the ring that reads the input from this touch sensor and activates a particular action only when the sensor senses that the user has slid his/her finger over the sensor, so as to avoid inputs taken by accidental/unintentional touch to the surface. The microcontroller i.e. central processing module transmits this data wirelessly (via Bluetooth) to a smartphone/computing device or any other machine with a processor. In an example embodiment, the processor includes a first processor and a second processor (not shown in FIG. 2), where the first processor is in the ring and the second processor is in the device i.e. mobile phone. The basic processing of input signals and sensor readings on the ring is done by the first processor which transmits some selective data from the input signal and sensors to the second processor wirelessly through a wireless module configured with the first processor. The heavier and more complicated processing happens in this machine/smartphone and based on multiple data points like the user's location, time of day, event saved in the calendar, user's personality, phone sensor data, etc., the machine/smartphone/computing device takes a specific action that may activate/deactivate or modify configuration of any connected device or service, simultaneously giving an output to the ring wirelessly via the first processor that acts as feedback for the action that just got completed, this feedback can be voice, haptic or light based. These data points are analysed by the instruction in the second processor thoroughly to predict what the user would want to do next and the most relevant and probable shortcuts are assigned to the ring's interface. In another example embodiment, the second processor may also transmit all required data points to a remote processor on the internet or cloud, and this heavier processing then happens in this remote processor or multiple number of such processors, the output of this processing is received as an output or some instruction to the second processor once the remote processing is done, the actions on any connected devices or services running on the mobile phone are activated/deactivated as per the instruction received and second processor further transmits output data or some instructions to the first processor for the user to perceive the feedback on the ring about the action taken. In addition to the Voice and vibrational feedback, the present invention uses a small screen to display small notifications on the face cover of the ring. Further, a small rectangular projection is made on the touch surface for a primary feedback that the user feels with his/her finger while scrolling/sliding his/her finger over the touch surface. The user can slide his/her finger over this surface in any direction in the curved plane of the surface.

Figure 3:
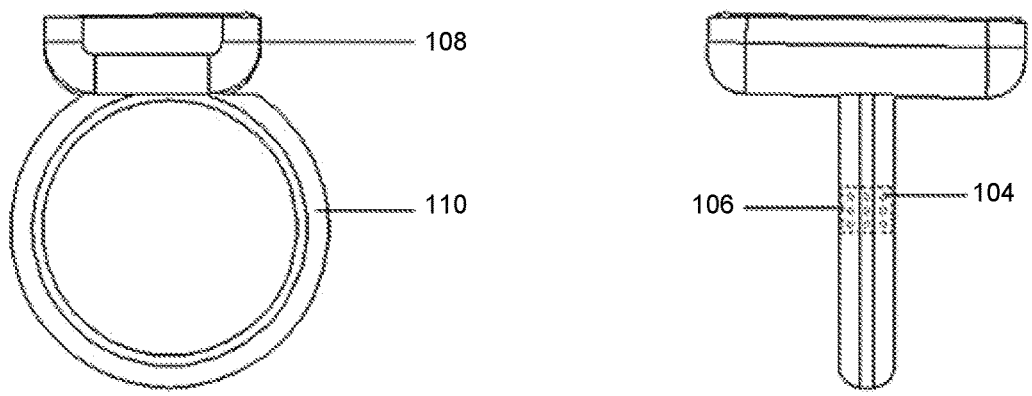
FIG. 3 shows a side view of the ring with structure of the feedback projections which look like a braille based pattern for tactile feedback according to one embodiment of the present invention.

The FIG. 3 shows a side view of the ring with structure of the feedback projections which look like a braille based pattern for tactile feedback according to one embodiment of the present invention.

Figure 4:
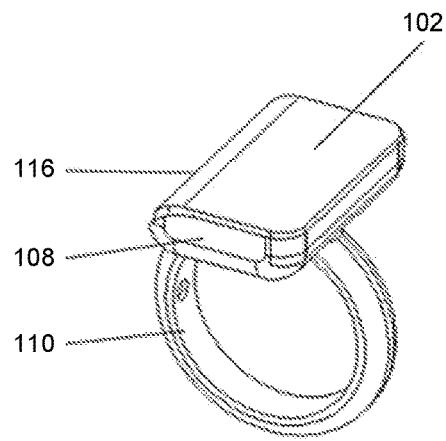
FIG. 4 shows the ring consists of a face cover that makes a curve at one edge of the face according to one embodiment of the present invention.

FIG. 4 shows the ring consists of a face cover that makes a curve at one edge of the face according to one embodiment of the present invention.

The FIG. 4 shows the ring consists of a face cover that makes a curve at one edge of the face. This edge can be used to display some text or notification icons to indicate what the ring is doing or is about to do. This edge is easier to look at when the wearer's hand is in relaxed position.

Figure 5:
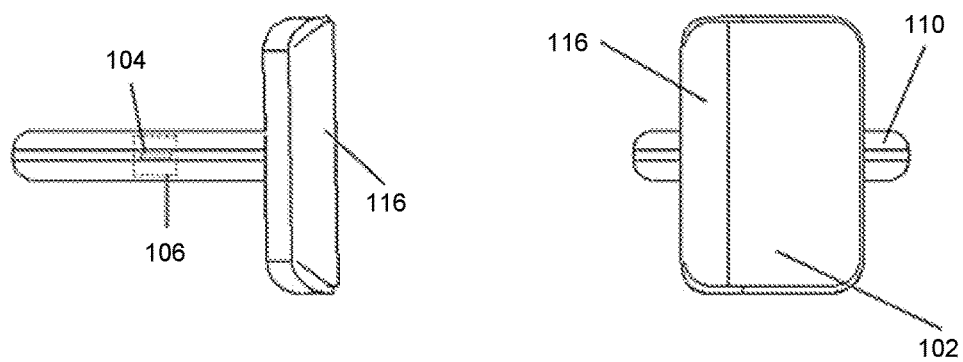
FIG. 5 shows an edge face cover of the ring in side and front views according to one embodiment of the present invention.

FIG. 5 shows an edge face cover of the ring in side and front views according to one embodiment of the present invention. The feedback projection over the touch surface can be seen from the side view.

The FIG. 5 shows the face (shown in FIG. 6), face edge, face cover, band, feedback projection, touch interface of the wearable ring-shaped electronic device. In an exemplary embodiment, the face is the front casing of the ring, wherein all circuitry and PCB including Speaker, microphone, Vibrational unit, Wireless antenna, microcontroller, and power source are all positioned inside the face. The face is the cover of the ring, where this part also acts as a screen to display notifications and data about predicted shortcuts on the ring. The band part of the ring is the area which is wound/worn on the finger of the user. The band area comprises of the touch slider interface. The feedback projections made over the touch surface are meant to give a tactile feedback to the user that he/she is moving his/her finer over the touch surface. The face cover extends towards of the sides or edge of the face, thus extending the display screen to the edge. This edge display is easier to see when the hand is kept in the relaxed position. So, without moving the hand or finger on which the ring is worn, the user can see the display screen. In an example embodiment, other display is also possible on the face of the device without restricting the scope of edge display.

In another exemplary embodiment, the face and the ring are merged together to form a single entity, wherein all circuitry and PCB including Speaker, microphone, Vibrational unit, Wireless antenna, microcontroller, and power source are all positioned inside the ring. For example, according to this embodiment, the single entity would be considered like a conventional wearable ring except that having an user interface to interact with the convention ring.

Figure 6:
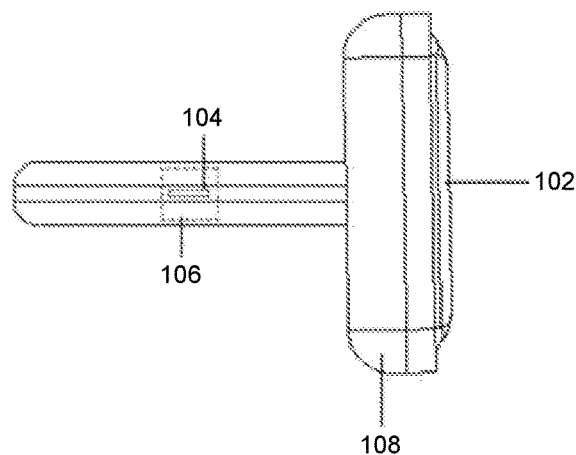
FIG. 6 shows a crystal shaped face cover chiselled from the edges that allows increase in space inside the face part of the ring for more components to fit according to one embodiment of the present invention.

FIG. 6 shows a crystal shaped face cover chiselled from the edges that allows increase in space inside the face part of the ring for more components to fit according to one embodiment of the present invention. This face cover also acts as a display for notifications on the ring.

Figure 7:
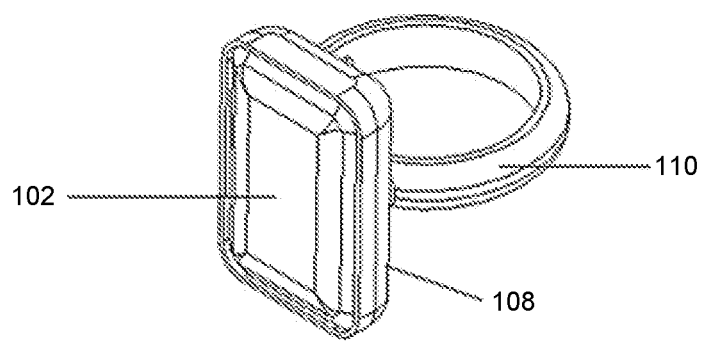
FIG. 7 shows a trimetric view of the ring according to one embodiment of the present invention.

The FIG. 7 shows a trimetric view of the ring according to one embodiment of the present invention.

Figure 8:
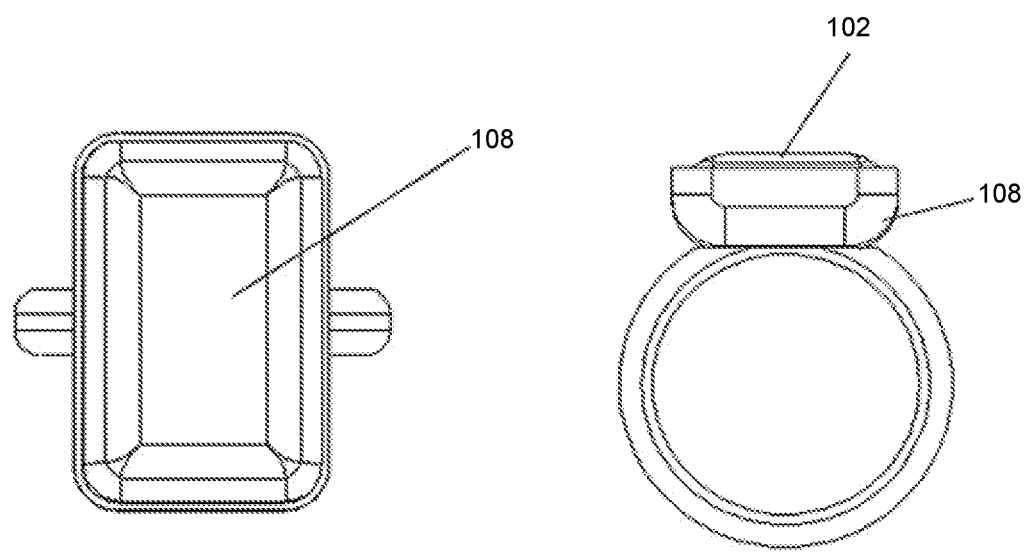
FIG. 8 shows a front view and top view of the ring according to one embodiment of the present invention.

The FIG. 8 shows a front view and top view of the ring according to one embodiment of the present invention.

Figure 9:
FIG. 9 shows a display on the front with feedback projections according to one embodiment of the present invention.

The FIG. 9 shows a display on the front with feedback projections according to one embodiment of the present invention.

Figure 10:
FIG. 10 shows a display on the Edge of the Face cover according to one embodiment of the present invention.

The FIG. 10 shows a display on the Edge of the Face cover according to one embodiment of the present invention.

Figure 11:
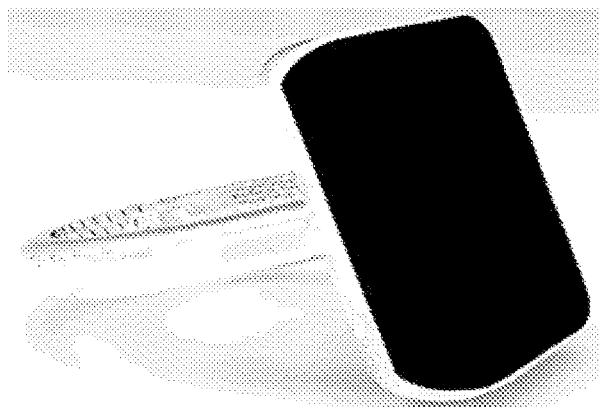
FIG. 11 shows a different design of the feedback projections according to one embodiment of the present invention.

The FIG. 11 shows a different design of the feedback projections according to one embodiment of the present invention.

Figure 12:
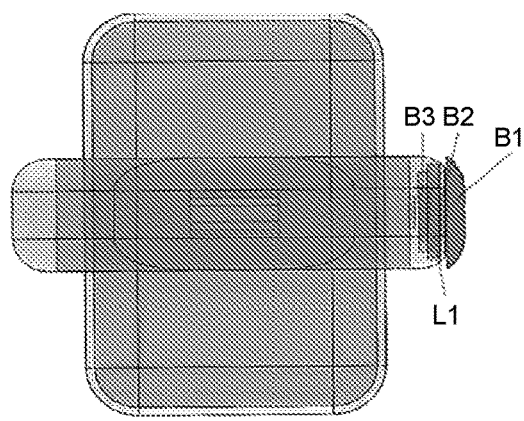
FIG. 12 shows a 3D model of the ring that uses a planar mechanical slider interface instead of a touch based interface showing three parts of slider button according to one embodiment of the present invention.

FIG. 12 shows a 3D model of the ring that uses a planar mechanical slider interface instead of a touch based interface showing the 3 parts of slider button according to one embodiment of the present invention.

The FIG. 12 shows a 3D model of the ring that uses a planar mechanical slider interface instead of a touch based interface showing three parts of slider button and where they are positioned inside housing in the band. Further, the FIG. 12 shows the neutral position of the slider button B1 wherein the Magnets M1 and M2 align together. The lock L1 restricts motion of slider button only in the plane of the Lock allowing an omnidirectional motion in this plane. The FIG. 12 further shows the slider buttons B1, B2, B3 and lock L. The B1 is the upper part of the slider button which encloses magnet M1, B2 is the mid-section of the slider button which encloses M1, the diameter of B2 is such that the lock L can fit around it and restricts motion in the plane complementary the plane of lock L, B3 is the bottommost part of the slider button that encloses M1. The base of B3 slides over the separating surface S2.

The lock is the one which locks the position of Magnetic button assembly for M1 inside the Band/Interface Housing so the slider button B1 does not fall off from the housing. Lock L is free to rotate in its plane about the centre of the neutral position of magnets or the neutral axis in between the space of S1 and S2.

Figure 13:
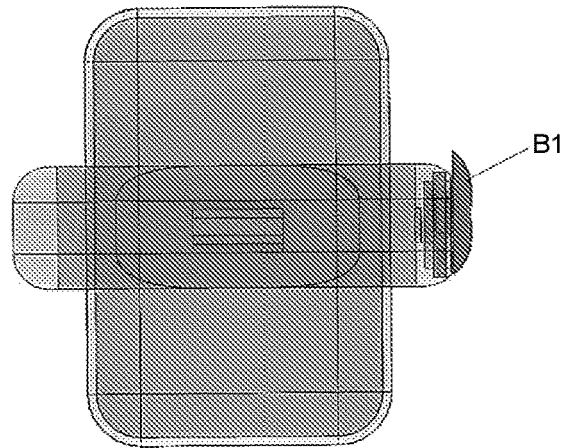
FIG. 13 shows a 3D model of the ring showing the allowable uppermost position of slider button limited by the housing orifice size according to one embodiment of the present invention.

The FIG. 13 shows a 3D model of the ring showing the allowable uppermost position of slider button limited by the housing orifice size according to one embodiment of the present invention. Further, the FIG. 13 shows the maximum displacement or sliding that can happen in the upward direction, this maximum displacement is restricted by the size of the orifice on surface S1 and the size of mid part of slider button B2.

Figure 14:
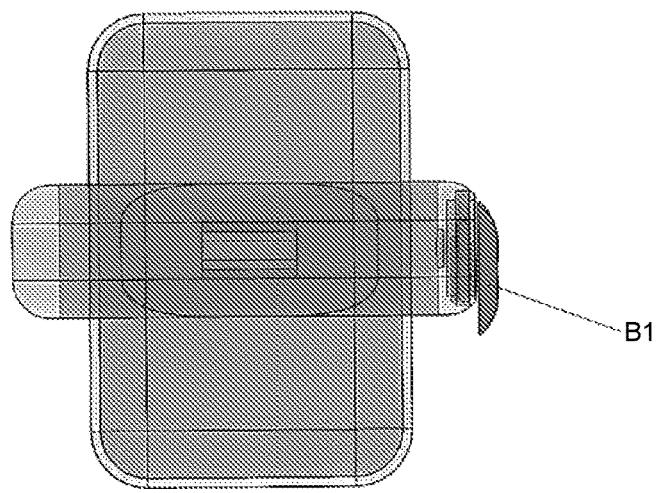
FIG. 14 shows a 3D model of the ring showing the lowermost position of slider button limited by the housing orifice size according to one embodiment of the present invention.

The FIG. 14 shows a 3D model of the ring showing the lowermost position of slider button limited by the housing orifice size according to one embodiment of the present invention. Further, the FIG. 14 shows the same maximum displacement of the slider button in the opposite direction.

Figure 15:
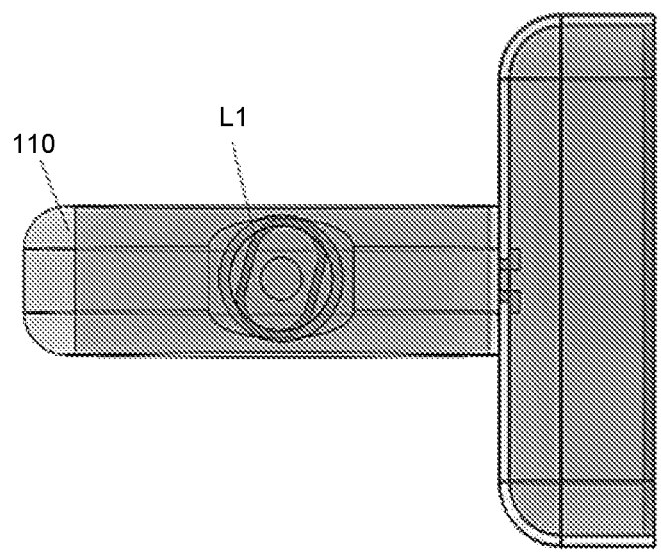
FIG. 15 shows a side view of the 3D model of the ring showing how Lock L1 is placed inside the interface housing in the Band part of Ring according to one embodiment of the present invention.

FIG. 15 shows a side view of the 3D model of the ring showing how Lock L1 is placed inside the interface housing in the Band part of Ring according to one embodiment of the present invention.

The FIG. 15 shows how the lock L prevents Slider button from leaving the housing assembly. Lock L has a bigger cavity made in the band/housing that allows the lock to freely rotate in its plane in 360 degrees, this lets the slider button move in all directions while still staying in contact with surface S2 of the housing.

Figure 16:
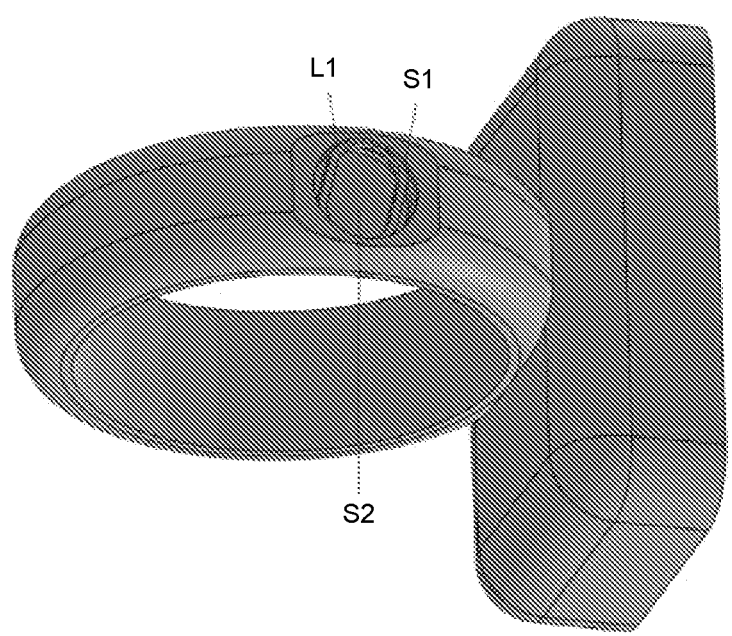
FIG. 16 shows a 3D model of the ring showing Lock L1 and top surface S1 of the interface housing according to one embodiment of the present invention.

FIG. 16 shows a 3D model of the ring showing Lock L1 and top surface S1 of the interface housing according to one embodiment of the present invention.

Figure 19:
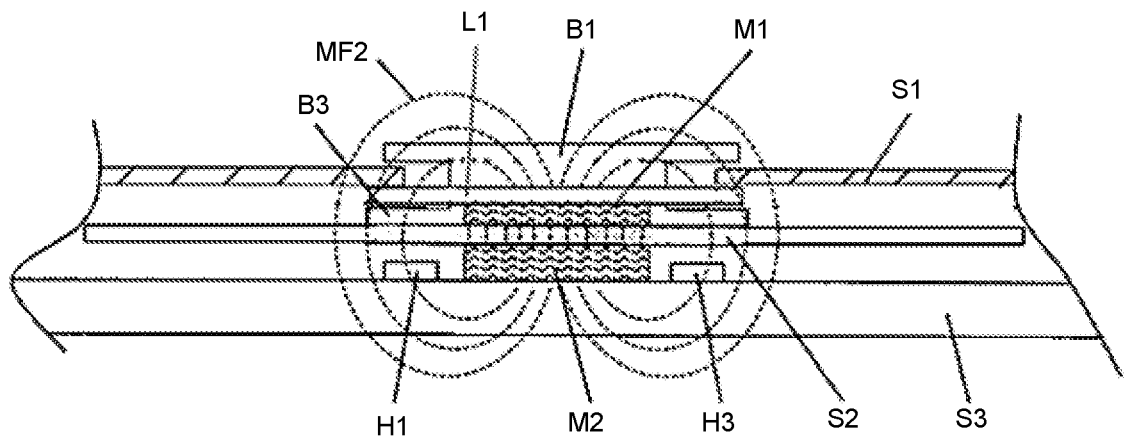
FIG. 19 shows a cross sectional view of the placement of Slider button on the ring interface housing with Magnets M1 and M2 according to one embodiment of the present invention.

The FIG. 16 shows a 3D model of the ring showing Lock L1 and top surface S1 of the interface housing, and further it shows surface plates S2, S3 (shown in FIG. 19). The S1 (surface plate) is the outer body of the Band part of the ring, B1 comes out through the orifice made in S1 for the slider interface housing. The S2 is the plate/surface that separates the two Magnets M1 and M2. The top part of S2 is made of a material with less friction so as to facilitate sliding of Slider button with M1 over it. The S3 is the surface/plate over which M2 and all Hall sensors to sense motion or position of M1 relative to M2. The S3 is the bottommost part of the slider interface housing.

Figure 17:
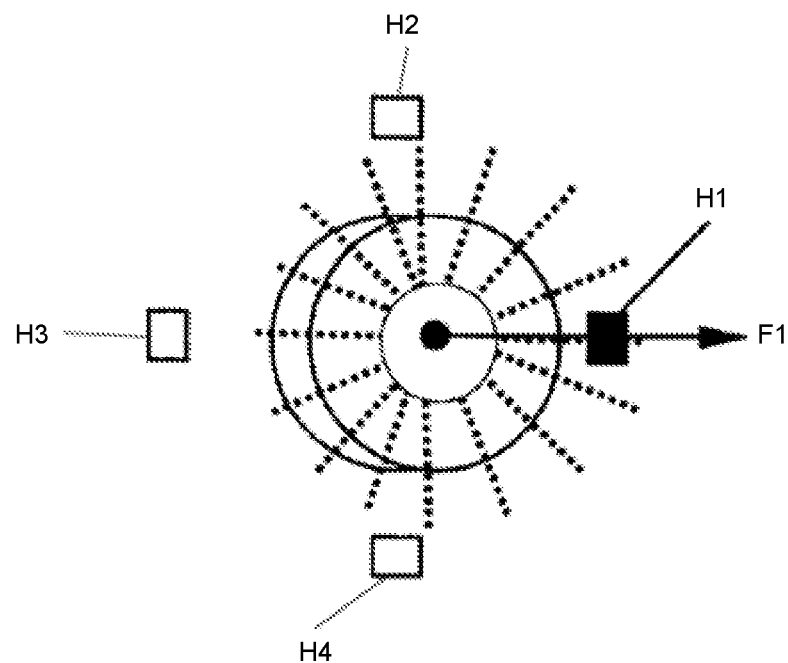
FIG. 17 shows a Magnetic sensor H1 gets activated when slider button with M1 is slid towards right with a force F1 according to one embodiment of the present invention.

FIG. 17 shows a Magnetic sensor H1 gets activated when slider button with M1 is slid towards right with a force F1 according to one embodiment of the present invention.

The FIG. 17 shows the magnetic sensors H1-H4, where the Magnetic sensor H1 gets activated when slider button with M1 is slid towards right with a force F1. These are hall sensors H1-H4 are placed parallel to the plane of the lock L over Surface S3, these sensors sense the position of the Magnet M1 which gives the position of the Slider button, and the sensors are electrically connected to a microcontroller circuit that processes these signals from hall sensors and act accordingly.

Figure 18:
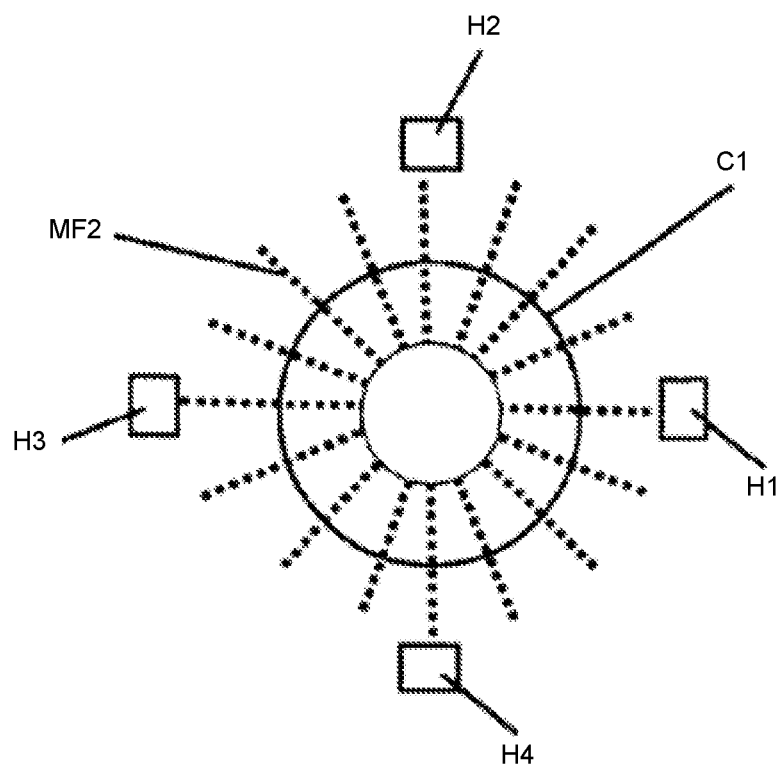
FIG. 18 shows top view of interface housing showing the four magnetic sensors according to one embodiment of the present invention.

FIG. 18 shows top view of interface housing showing the four magnetic sensors according to one embodiment of the present invention.

FIG. 19 shows a cross sectional view of the placement of Slider button on the ring interface housing with Magnets M1 and M2 according to one embodiment of the present invention.

The FIG. 19 shows a cross sectional view of the placement of Slider button on the ring interface housing with Magnets M1 and M2. The interface here is an input device for controlling applications on a connected product wirelessly. The interface is a planar joystick on the Band (shown in FIG. 12) of the Ring as shown in FIG. 13 which comprises of a movable sliding button B1 having a magnet (or electromagnet) M1 embedded in the interface assembly. The button is slid by a user's finger over a second magnet M2 whose position of fixed so as to keep the neutral position of M1 at the centre of the device due to magnetic attraction between M1 and M2. The sliding motion of M1 with respect to M2 distorts the magnetic flux which is detected by a plurality of magnetic sensors placed in the plane of M2 via H1, H2, H3 and H4 (FIG. 17). This data of detected motion from Magnetic sensors is sent to a microcontroller for further processing. The sliding motion of M1 relative to M2 distorts the magnetic flux in the housing area and this is detected by one or more magnetic sensors/hall sensors H1-H4, FIG. 17 shows a top view of the sliding of M1 over M2 and sensing of this motion in sensor H1. The two magnets are separated by a thin surface S2 that is not magnetic which lets the device be water resistant and let the Slider Button B1 which encloses the Magnet M1 slide with little friction on this surface. Hall sensors convert the magnetic field into voltage which can be used to accurately determine the relative position of the magnets.

The housing of the interface is shown in the Band part of the ring in FIG. 15, here the maximum sliding motion of the Magnetic slider M1 is restricted by the housing orifice on the top surface of the band. Below this surface of the band, there is another plate which has a conveniently slippery surface on the top to allow sliding motion of slider button B3 over itself, this surface of little thickness is used to separate the two Magnets M1 and M2 wherein M1 is enclosed in slider button B1-B3. Further under this plate S2, the magnet M2 is placed along with the Magnetic field sensors to sense the direction of motion of M1 relative to M2.

The neutral position of M1 is the centre of the orifice in top of the housing where the two magnets M1 and M2 feel maximum magnetic attraction, just over the fixed magnet M2 as shown in FIG. 12. Since this position is the position of maximum magnetic attraction between M1 and M2, the user has to make an effort against this magnetic force of attraction to slide M1 away from this neutral position, as shown in FIG. 17 wherein Magnetic Sensor H1 gets activated due to force F1 to slide the slider button towards right.

The whole interface acts as a planar joystick i.e. the Magnetic button M1 comes back to the neutral position as the external force F1 given by the user to slide M1 is released This happens because M1 is always attracted towards the central/neutral position i.e. the position of maximum magnetic flux and aligns with the position of M2.

The shape of the button that encloses magnet M1 is made in such a way that a mechanical lock L can prevent slider button with M1 enclosed from falling outside the housing assembly due to some external forces that act against the Magnetic forces of attraction between M1 and M2. MS1 is the space provided in the slider button with parts B1-B3 to put the magnet M1 inside. B1 and B3 close M1 from both sides.

Figure 20:
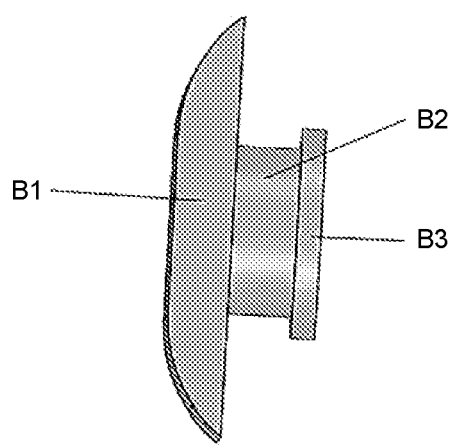
FIG. 20 shows a side view of the slider button of the ring according to one embodiment of the present invention.

FIG. 20 shows a side view of the slider button of the ring according to one embodiment of the present invention.

Figure 21:
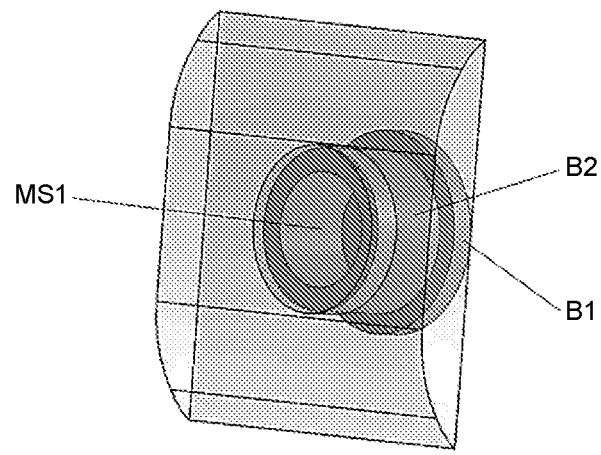
FIG. 21 shows slider button's cavity in part B2 to place Magnet M1 according to one embodiment of the present invention.

FIG. 21 shows slider button's cavity in part B2 to place Magnet M1 according to one embodiment of the present invention.

Figure 22:
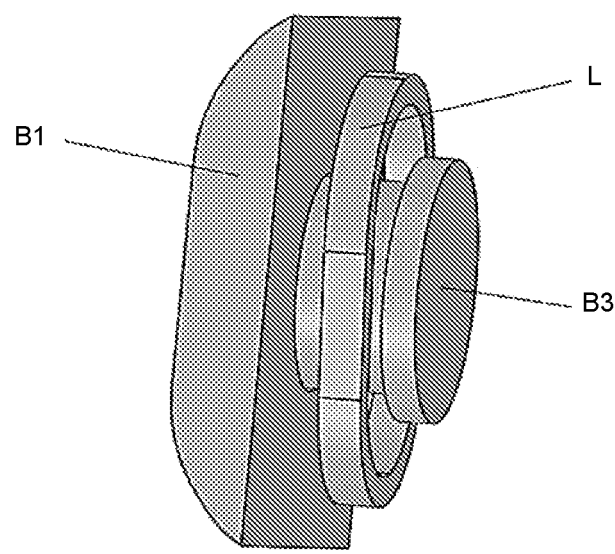
FIG. 22 shows a mechanical slider lock assembly according to one embodiment of the present invention.

FIG. 22 shows the mechanical slider lock assembly according to one embodiment of the present invention.

Figure 23:
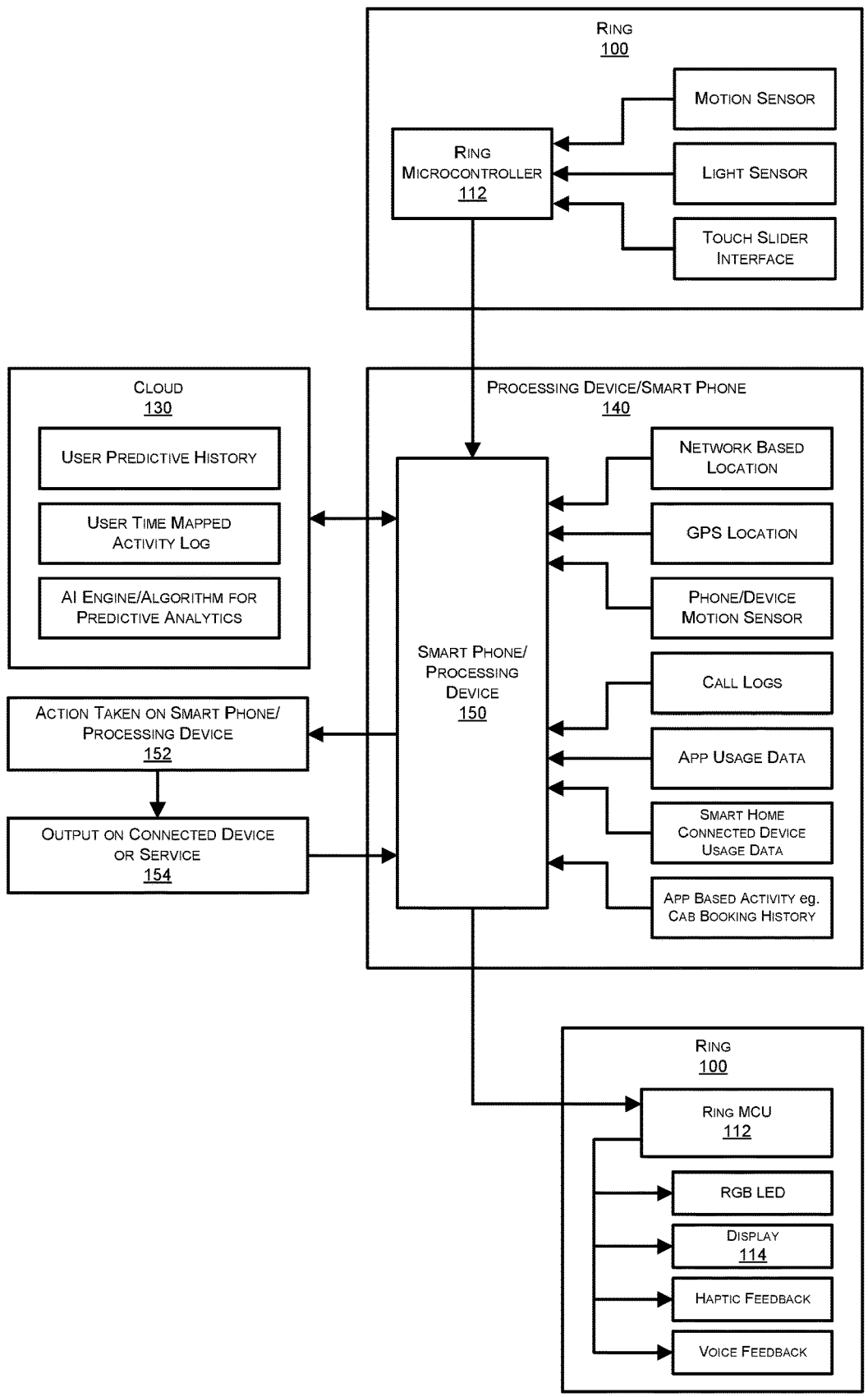
FIG. 23 shows the functional block diagram of wearable ring-shaped electronic device according to one embodiment of the present invention.

FIG. 23 shows the functional block diagram of wearable ring-shaped electronic device according to one embodiment of the present invention.

The FIG. 23 shows the functional block diagram of wearable ring-shaped electronic device. The wearable ring-shaped electronic device consists of motion sensor, light sensor, touch slider interface, display module with PCB including Speaker, Microphone, controller, Vibrational unit, Wireless antenna, microcontroller, power source, ring microcontroller, RGB LED, Haptic feedback unit etc. The wearable ring-shaped electronic device coupled to the computing device wirelessly i.e. Bluetooth which includes a mobile phone, laptop computer, personal digital assistant, tablet computer, palmtop computer, or any other such device with the ability to communicate with the ring via a wireless connection. There might be other devices, but they are not shown for simplicity.

The computing devices can be any of a variety of wireless communication devices. The computing devices are configured with a data storage area respectively. The data storage areas may be internal or external storage devices and may also be removable storage devices. The computing devices are also configured with a location module respectively. The location modules may be implemented in hardware or software or some combination of the two. Further, the computing device is further configured with network based location, GPS location, Device motion sensor and all such features of smart phone. Following are the components all of which or some of which may be assembled together in different embodiments of the art.

Speaker: There is a speaker attached to the ring so that voice/sound feedback can be given to the user when he/she places the finger near the ear. It is also used to take phone calls.

Bone Conduction Speakers: The Bone Conduction Speaker module acts as an additional feedback for voice commands and lets the user take phone calls through the ring. These are used to send sound in form of mechanical waves from the user's finger to the user's ear when the user touches the ear. They conduct sound through the finger to the ear enabling the user to take calls and hear feedback through his/her finger. The bone conduction speaker is also used to create low frequency vibrations that act as haptic notifications for the user to notify him/her of different notifications.

Directional Speakers: These speakers are made from ultrasonic piezo elements that are capable of giving a sound focused in a particular direction like a laser beam. When the user points his/her finger towards the ear, he/she can hear the sound coming from the ring. Thus, using directional speakers, the user can take calls, use voice commands by only pointing the finger on which ring is worn, towards the ear.

Microphone: Microphone is used for enabling voice assistant, the ring takes input from the user when he/she says a particular voice command to get something done. Mic is also used to enable the user to take/make phone calls through the ring.

Motion sensor: The motion sensor senses the motion of the user's finger in 3 dimensions and collects this data for activity tracking purposes. This data is also sent to the main processor along with slider input to understand the current user activity and better predict what the user wants to do at a particular point of time.

RGB LED: This may be used to provide coloured light feedback for the action taken by the ring or notifying the user of notifications received in the smartphone.

Screen: i.e. display module. This is used to display what the shortcuts mean in real time and help the user select the action which he/she wishes to do. For example, if the user has to call a person A, the predictive algorithm will already keep the shortcut on the display to call A, based on the accuracy of our predictive software. Thus, the ring will show A's name on the display at the time when user would have a very high probability of calling A. The user checks the display once to confirm shortcut name and sliding up on the touch surface will make the call to A. The user can then talk through the ring's speaker and microphone making use of the mobile phone network of the smartphone connected wirelessly with the ring by putting his finger near the ear.

Light Sensor: This is used to sense the ambient light, the level of ambient light can be used to decide the intensity of light emitted by the feedback LED for different actions.

Motion Sensor module: A motion sensor module is connected to the computer/processor in the ring circuitry. This motion sensor senses movement of the finger on which the ring is worn. The module has a memory connected which can store such sensor data, this sensor data may be analysed in the computer connected to the ring itself or the data can be transmitted wirelessly to the processing device/central unit or the smartphone. This data from the motion sensor module can then be used as an additional data point for analysing user data and predicting what the user wants to do next in the predictive analytics algorithm running on another processor on the wirelessly connected device/smartphone. This data from motion sensor module can also be used as an input given by the user to activate or deactivate a certain task, for example, gesture recognition of a flick of the finger towards left can be used to reduce volume of a speaker that is wirelessly connected to the processing device. The motion sensor module is also capable of detecting the tilt created in the ring with respect to its neutral position when the user's second finger touches or slides over the ring worn on the first finger. The motion sensor detects this direction of slide based on the specific tilt made by the said motion and this reading of the motion sensor can act as an additional input for the device.

Tactile feedback: The touch surface on the band of the ring has a specific texture that is designed in such a way that the user, when slides his/her finger over the surface, feels the direction he/she is sliding towards and understand when the active touch surface ends. The texture has embossed patterns which have different heights and density at different locations of the touch surface indicating the four directions up, down, left, right on this surface to facilitate the user in sliding his/her any of the finger or thumb in the right direction over the touch surface.

Vibration Feedback: The embodiment in discussion has a device connected to the ring's main circuitry that vibrates as per the electrical signal passed through it, it can be a vibration motor, a haptic motor, a linear actuator based system or a bone conduction system. Presently, the device uses a bone conduction speaker. The Bone conduction speaker vibrates a metal plate and conducts sound in solid bodies instead of air as is done by air based speakers. The Bone conduction speaker is used to send vibrational notifications and feedbacks to the user as per the actions taken by the user on the ring. Also, each direction of sliding on the ring has been given a specific vibrational pattern to it, e.g. If the user slides up, the primary feedback he/she receives is a vibrational sound of increasing intensity which signifies up movement of slider, similarly, a down slide will give a vibrational pattern based on a sound selected by the microcontroller whose intensity goes keeps going down until the user stops the sliding or reaches to the bottom of the touch surface. Right and left directions are also given signature vibrational patterns so as to aid the user in getting an instant primary feedback about the direction he/she is sliding towards as would have been the case if one use a mechanical joystick whose direction and extent of motion is limited by a mechanical body in which the joystick moves. Since the user feels a reaction force when he/she has reached the limit of motion of the joystick, this feeling acts as the primary feedback of the direction of motion and the confirmation of the working of the interface. The present invention device has tried to simulate the same feeling by giving an instant primary feedback of the motion that the user just made on a touch based sensor/surface.

Secondary feedback means the feedback given to the user about the confirmation of an action which he/she wanted to take as a result of the sliding action he/she did. Example, sliding up will give a primary feedback of increasing vibrational pattern in addition to the texture of the surface which is identifiable by the touch of a finger. The secondary feedback would be given for an action that is taken because of the sliding input, like making a call to a specific person based on the central device's algorithm wherein it predicted what the user wants to do when he/she slides up at that instant of time. When the call is made, the user receives a vibrational feedback of a different pattern. This, in addition to the notification that comes on the ring's screen constitutes as the secondary feedback.

Figure 26:
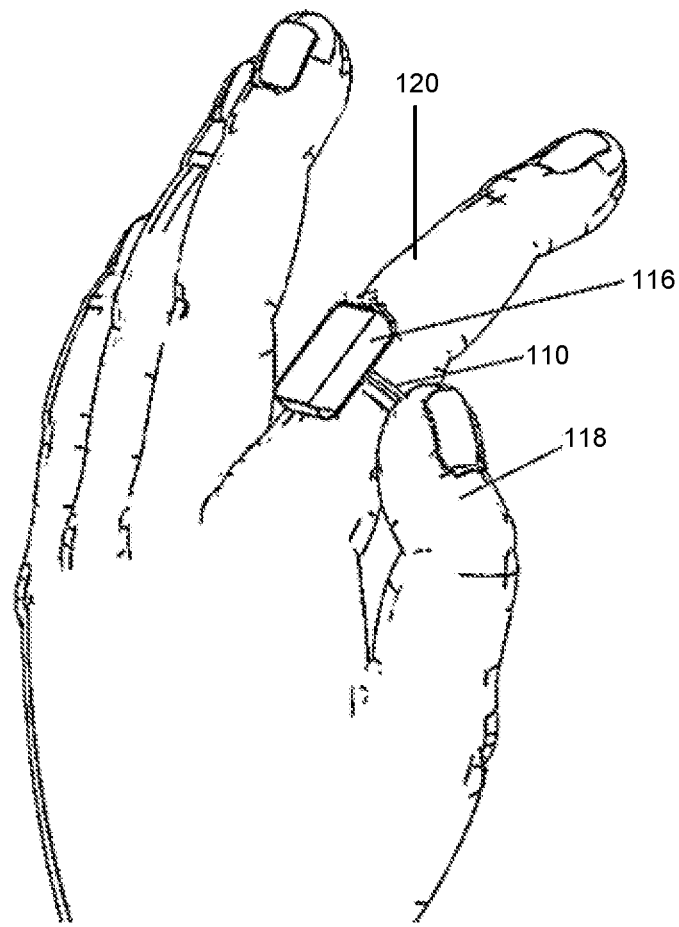
FIG. 26 shows the user sliding the thumb over the band's touch interface showing the input interaction on the device at work

The Interface: As discussed before, the touch sliding interface as shown in FIG. 2 acts as one of the most efficient Human Computer interfaces. The touch interface on the band part of the ring makes use a touch sensor placed just under the outer casing of the band. This touch sensor is connected to a microcontroller circuitry capable of processing the input data from this sensor and many other sensors embedded inside the ring, mostly inside the face casing. The microcontroller is also responsible for sending these data points (sensor data from various sensors including the input from touch sensor) to a device with higher processing power so as to avoid the battery consumed in processing such data. This other device may be a smartphone/computing device or any other wireless connected device. The smartphone processes the data sent by the ring wirelessly based on the service/software/application running in the smartphone/computing device in the background. This processing involves Data analytics and predictive analytics on multiple data points about the user including the user's schedule, phone activity, phone sensor data, ring sensor data, data about user stored with other services in the phone or the internet. Using these data points, the application/software predicts what the user wants to do at that point of time and indicates the same on the screen on the ring, again through wireless communication between smartphone/computing device and ring. This time mapped predicted shortcut is seen on the ring's screen/face cover/face edge and based on the direction of sliding on the touch surface on the ring, the required task on the smartphone will be done. FIG. 26 shows the user sliding his thumb over the touch sensor. Once the task is finished, the smartphone communicates this status back to the ring which may give either a combination of voice feedback, vibrational feedback, visual feedback on ring's screen, illumination of LED with feedback specific colour or each of these feedback mechanisms may be individually used. This selection of what feedback to use also depends on the result of data analytics done on the data points from the ring, smartphone and the internet. For example, if the data suggests that the user is in a meeting, the feedback will be only vibrational.

Thus by a wireless combination of the ring, the smartphone and data analytics, the present invention creates a very efficient interface that requires only sliding one finger over the ring's band region in any of the 4 directions to initiate an action on any connected device or service that the phone can control. Regular usage of the application/software and the ring also keeps increasing the data points that are being used, these data points give a particular prediction at a time on the ring and these predictions are compared with the actual user activity i.e. whether the user did the same task which the ring predicted or not, and accounting for the correctness or error that occurs with these predictions for future predictions, the present invention is based on a machine learning model that keeps learning about the user more and more as the user keeps using the ring and the application/software to get things done on his/her smartphone and gets better at predicting the next user activity by minimizing the errors in prediction in the past. Thus, making an algorithm specific to each user giving a personalized prediction.

This touch slider surface also has a specific language that the user can set as per his/her choices. The four directions can be hard coded on the computing device/phone's application/software to get attached to a particular type of shortcut. For example, sliding up will be used only for making phone calls, sliding down will act as negative or undo for the last activity done, so sliding down will cut the call when a call is in process and the same sliding down action switches off the alarm, light, smart kettle depending on the user's schedule and recently predicted activity. Similarly, right slide can be used to activate voice commands and the Left slide is left for custom shortcut that the user uses the most, like booking a cab though app based booking to a predicted location. Thus without taking the phone out of the pocket or handbag, the user can complete his/her day to day tasks just using the ring.

In another embodiment, the interface is an input device for controlling applications on a connected product wirelessly, wherein the interface is a planar joystick on the Band (FIG. 12) of the Ring as shown in FIG. 13 which comprises of a movable sliding button B1 having a magnet (or electromagnet) M1 embedded in the interface assembly. The button is slid by a user's finger over a second magnet M2 whose position of fixed so as to keep the neutral position of M1 at the centre of the device due to magnetic attraction between M1 and M2. The sliding motion of M1 with respect to M2 distorts the magnetic flux which is detected by a plurality of magnetic sensors placed in the plane of M2 via H1, H2, H3 and H4 (FIG. 17). This data of detected motion from Magnetic sensors is sent to a microcontroller for further processing. The sliding motion of M1 relative to M2 distorts the magnetic flux in the housing area and this is detected by one or more magnetic sensors/hall sensors H1-H4, FIG. 6 shows a top view of the sliding of M1 over M2 and sensing of this motion in sensor H1. The two magnets are separated by a thin surface S2 that is not magnetic which lets the device be water resistant and let the Slider Button B1 which encloses the Magnet M1 slide with little friction on this surface. Hall sensors convert the magnetic field into voltage which can be used to accurately determine the relative position of the magnets.

The housing of the interface is shown in the Band part of the ring in FIG. 15, here the maximum sliding motion of the Magnetic slider M1 is restricted by the housing orifice on the top surface of the band. Below this surface of the band, there is another plate which has a conveniently slippery surface on the top to allow sliding motion of slider button B3 over itself, this surface of little thickness is used to separate the two Magnets M1 and M2 wherein M1 is enclosed in slider button B1-B3. Further under this plate S2, the magnet M2 is placed along with the Magnetic field sensors to sense the direction of motion of M1 relative to M2.

The neutral position of M1 is the centre of the orifice in top of the housing where the two magnets M1 and M2 feel maximum magnetic attraction, just over the fixed magnet M2 as shown in FIG. 12. Since this position is the position of maximum magnetic attraction between M1 and M2, the user has to make an effort against this magnetic force of attraction to slide M1 away from this neutral position, as shown in FIG. 17 wherein Magnetic Sensor H1 gets activated due to force F1 to slide the slider button towards the right.

The whole interface acts as a planar joystick i.e. the Magnetic button M1 comes back to the neutral position as the external force F1 given by the user to slide M1 is released This happens because M1 is always attracted towards the central/neutral position i.e. the position of maximum magnetic flux and aligns with the position of M2.

The shape of the button that encloses magnet M1 is made in such a way that a mechanical lock L can prevent slider button with M1 enclosed from falling outside the housing assembly due to some external forces that act against the Magnetic forces of attraction between M1 and M2.

The processor used in the present invention is fast enough to support wireless connections and transmit and receive I/O data by communicating with another device with a more powerful processor that can process all the incoming data, thus allowing us to save power and use a small battery for the device. Also, the present invention uses a small touch sensor which takes four kinds of inputs only, but the system is designed in such a way that these four inputs can control all connected services and devices.

Figure 24:
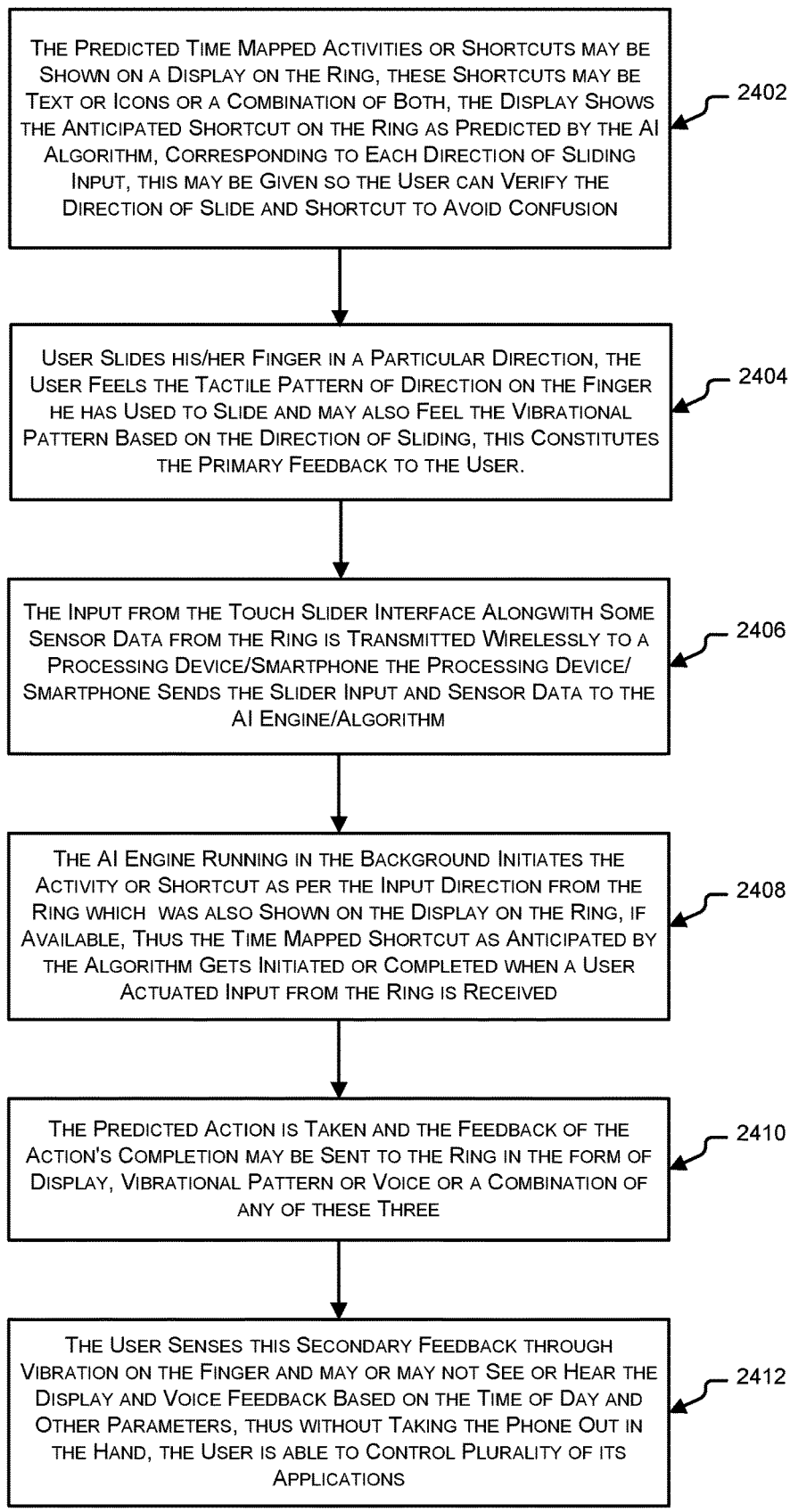
FIG. 24 shows the working of wearable ring-shaped electronic device according to one embodiment of the present invention.

FIG. 24 shows the working of wearable ring-shaped electronic device according to one embodiment of the present invention.

The FIG. 24 shows the working of wearable ring-shaped electronic device. The ring is wirelessly connected to the computing device/smartphone where the algorithm running as a service has mapped different activities or tasks to different directions of sliding on the ring, at different times of the day based on Machine learning models and Data analytics on user data. The smartphone/computing device keeps sending these time mapped activities to the ring where this information of mapping sliding directions and task associated with it may be displayed on the screen, face or face edge. This information keeps updating with time according to the algorithm running in the smartphone/computing device. Now, the user wanting to do a task A glances on the ring display and finds a direction of slide associated with task A since the algorithm predicted that the user would want to compete task A between Time T1 to Time T2. Now, the user slides his/her finger in the direction specified for task A, user feels the tactile pattern of direction on the finger he/she has used to slide and may also feel the vibration pattern based on the direction of sliding. This constitutes the primary feedback to the user. The input from the touch slider interface along with some sensor data from the ring is transmitted wirelessly to a processing device/smartphone/computing device. The processing device/smartphone gives the slider input and sensor data to the AI engine/algorithm. The processing device already knows that task A is to be completed because it was already predicted and time mapped with the user but the algorithm/AI engine again processes the data from the ring and the data available about the user from the smartphone in real time to confirm user's intent. Then, the predicted action is taken through the processing device/smartphone and the feedback of the action's completion, task A is sent to the ring in the form of display, vibrational pattern or voice or a combination of any of the three. The user feels this vibrational secondary feedback on the finger and may and may not see or hear the display and voice feedback based on the time of day and other parameters. Thus without taking the phone out in the hand, the user is able to control many of its applications.

Once task A gets complete and the same is recognised by the algorithm, the algorithm may display the next Task, say task B on the display of the ring associated with a particular direction of sliding input on the ring based on the next set of time mapped tasks and activities as per the algorithm. These time mapped activities can also change their time slots in real time and hence, are not strictly time based.

The display may show all 4 shortcuts at the same time on the display of the face/face edge associated with each of the 4 directions of sliding on the touch slider interface. The user may then see the display and choose which shortcut he/she wants to use and provide input accordingly. These 4 shortcuts are also time mapped shortcuts/tasks as predicted by the algorithm running in the processing device which have the highest likelihood or probability of being wanted or controlled by the user at that particular time. If the user does not find the shortcut or task to be done on the ring at a particular time, the user can use the device's mic to give a voice command to get the task done, thus, for unscheduled tasks or shortcuts which the user does not use often, the user can use voice commands for those tasks/shortcuts.

In an exemplary embodiment, the AI algorithm and Machine learning models are stored on a remote processor on the cloud/internet or any other wireless network and the computer/processor of the smartphone or any other device connected to the internet and the ring transmits the required data points to this remote processor for predicting what the user wants to do next. The ring processor and the smartphone processor both act passively in this case and most of the processing and prediction happens on the remote processor.

The touch slider interface on the ring senses the sliding motion of the user's finger over the Touch surface "T1" of the ring. This motion is sent to the microcontroller connected to the other sensors electrically. The microcontroller sends this data along with some other sensor data on the ring like data from the Light sensor and the motion sensor together wirelessly to a smartphone or any other connected device, a central device or processing device. In addition to the data points and inputs given to the central device from the ring, the central/processing device receives inputs and data points from other connected devices like headphones, smart watches, smart home appliances and the sensors directly connected to the central device. This central device processes the received signals from the ring and act as per an algorithm that is based on Predictive analytics and data processing which predicts what the user is wanting to do at the current time and the action corresponding to the direction of sliding on the touch surface is taken. The action controls a specific task which can be controlled/activated from this central device's primary interface, in the embodiment in discussion, it is the smartphone's touchscreen and voice based interface like Google Assistant and Apple Siri. The actions that can be controlled by the ring via the smartphone include controlling connected smart home devices, making a phone call to a specific person, call a cab through a service running in the central device/smartphone. Thus, just by sliding the thumb or any other finger over the touch slider interface on the ring, the user is able to do multiple tasks on his smartphone and connected devices. The ring also accepts voice commands and is able to take phone calls as it has a mic in addition to a speaker.

A ring worn on the finger having a touch based surface that senses the sliding motion made over it by the user's finger or thumb. This touch sensor interface is connected to electronic circuitry inside the ring. The ring (wearable ring shaped electronic device) with such an interface that connects wirelessly to devices in order to control the device's features. The ring with such a touch interface that makes use of Data analytics to predict what the user is going to do next and keeps changing the task associated with different directions of the slider input in real time. The ring with such a touch interface that has an e-ink or led based display attached to it. The ring with such a touch interface that is based on magnetic interaction between magnets enclosed in interface housing. The wearable ring-shaped electronic device with the touch interface is based on potentiometer or resistance sensing to sense the slider motion. The wearable ring-shaped electronic device with touch interface is based on optical tracking technology to sense the slider motion. The wearable ring-shaped electronic device with touch interface uses signature vibrational feedbacks of varying intensities for different input actions.

Figure 25:
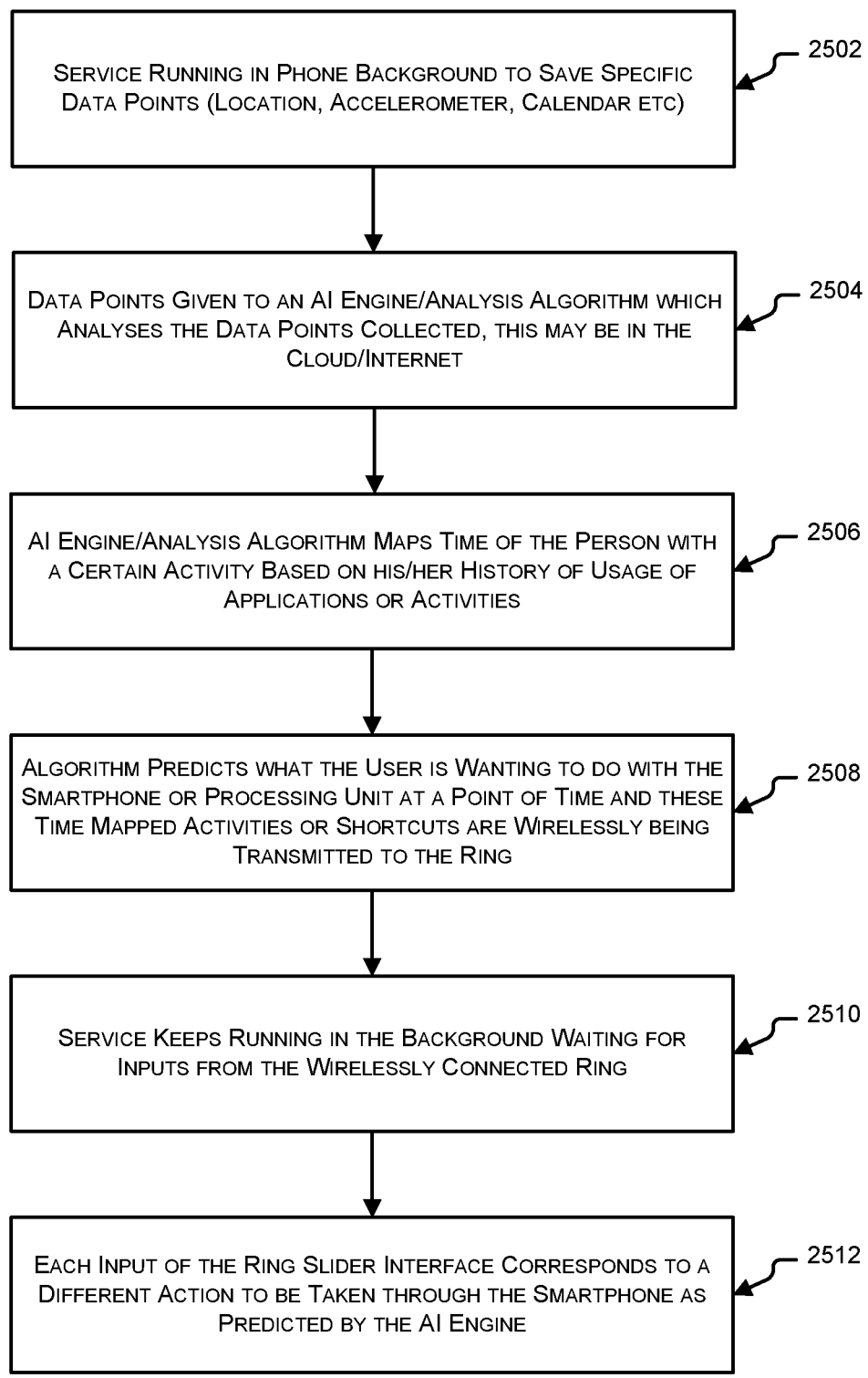
FIG. 25 shows the flowchart for the background process of wearable ring-shaped electronic device according to one embodiment of the present invention.

FIG. 25 shows the flowchart for the background process of wearable ring-shaped electronic device according to one embodiment of the present invention.

The FIG. 25 shows the flowchart for the background process of wearable ring-shaped electronic device. The service running in Phone/computing device background is to save specific data points (location, accelerometer/motion sensor, calendar, etc.) The data points given to an AI engine/Analysis algorithm which analyses and creates a meaningful representation of the data points collected. This may be in the cloud AI Engine/Analysis algorithm maps time of day with a certain activity based on user's history of activities. The algorithm predicts what the user wants to do with the smartphone at a point of time. In the present invention, the time mapped activities are predicted by the service that keeps running in the background of the computing device waiting for inputs from the wirelessly connected ring. Each input of the ring slider interface corresponds to a different action to be taken through the smartphone as predicted by the AI engine i.e. the time mapped activities.

Figure 27:
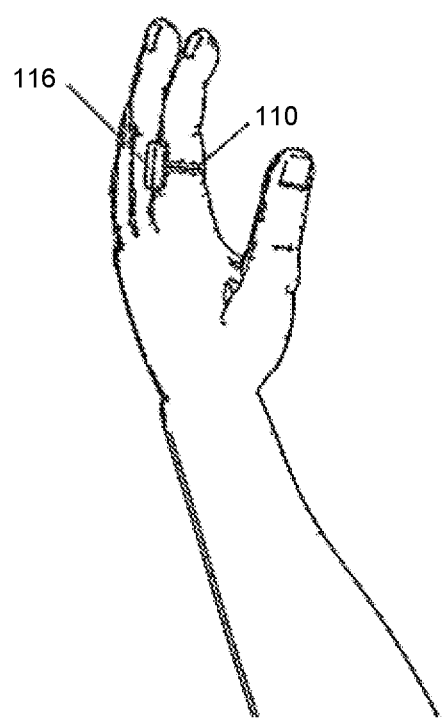
FIG. 27 shows the left hand of the user wearing the ring from the point of view of the user, the hand can be seen kept in a relaxed position and the Edge display is still visible to the user.

The present invention provides a touch slider based interaction on a ring with an innovative tactile feedback wherein two feedbacks: The texture of the touch slider that is designed to let the user feel the direction of motion of his/her finger on the interface that takes some cues from Braille based interfaces, and the vibrational patterns coming from the control circuitry of the ring aligns with the direction of sliding, for example, if the person slider the finger up on the ring interface, the vibration from a vibrational component attached to the circuit on the ring creates a vibration pattern that increases in intensity from a reference level continuously until the person stops sliding up. Further, the invention features an edge based display on the ring which can be seen by the user at most times when his/her hand is in the relaxed or natural position as shown in FIG. 27, this display gives the user a convenient way to check notifications coming from the smartphone or the shortcuts assigned on the ring at a particular time. The touch slider interface acts as one of the easiest ways to control connected devices and services a person uses in his day to day life. Being an interface that gets activated only when the user slides his/her finger over it, accidental activation of the interface/shortcut is avoided. In comparison, a direct touch based system would be very prone to accidental activation. The sliding touch based interface also lets the device remain water resistant to a certain extent as the whole interface is covered by metal.

FIG. 26 shows the user sliding the thumb over the band's touch interface showing the input interaction on the device at work FIG. 27 shows the left hand of the user wearing the ring from the point of view of the user, the hand can be seen kept in a relaxed position and the Edge display is still visible to the user.

Figure 28:
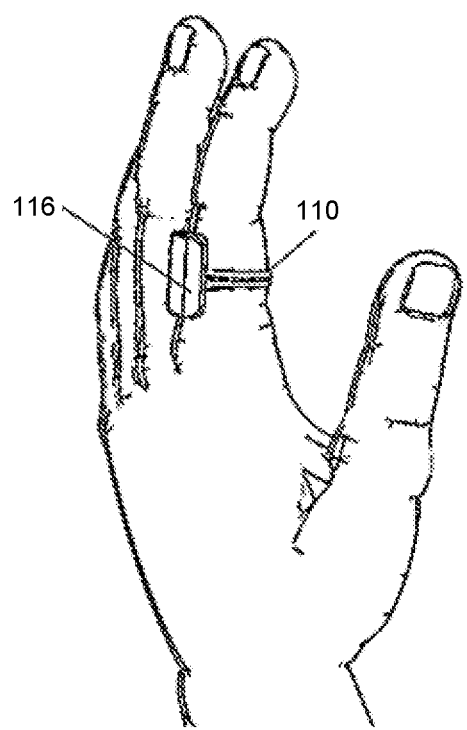
FIG. 28 shows the left hand of the user wearing the ring from the point of view of the user when the hand is closer to the user's face, the hand can be seen kept in a relaxed position and the Edge display is still visible to the user.

FIG. 28 shows the left hand of the user wearing the ring from the point of view of the user when the hand is closer to the user's face, the hand can be seen kept in a relaxed position and the Edge display is still visible to the user.

FIGS. 29A-D shows an exemplary implementation of a fingertip interaction for motion only between Index finger and Thumb using the ring.

Figure 29A:
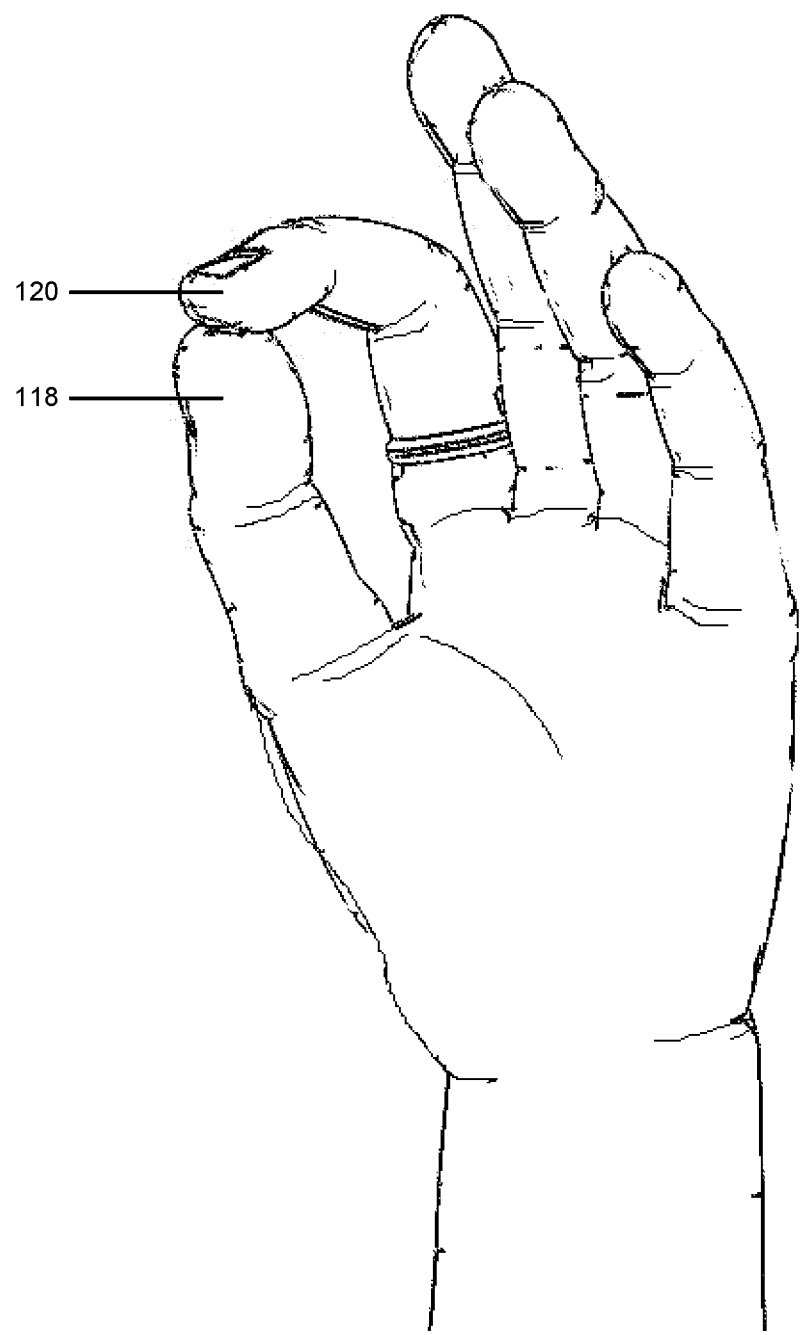
Figure 29B:
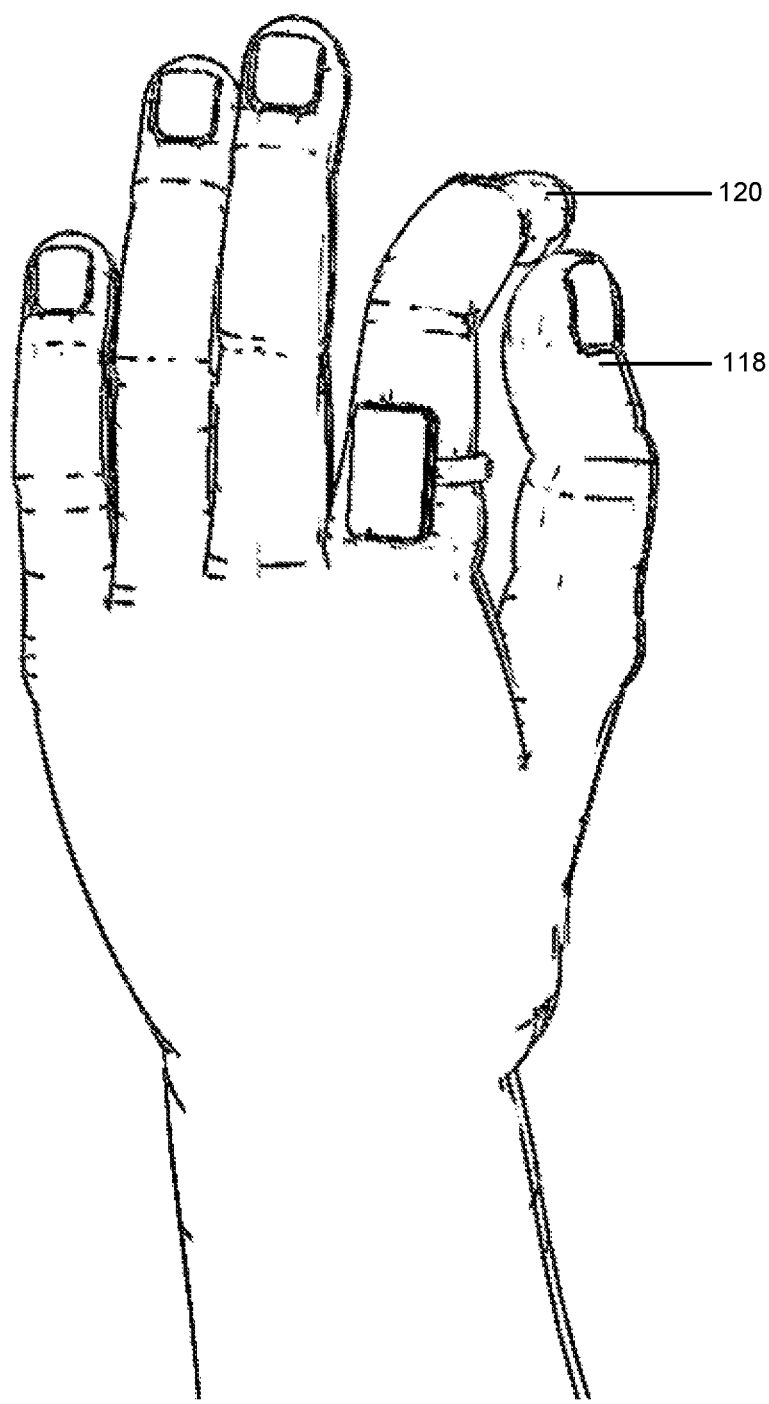
Figure 29C:
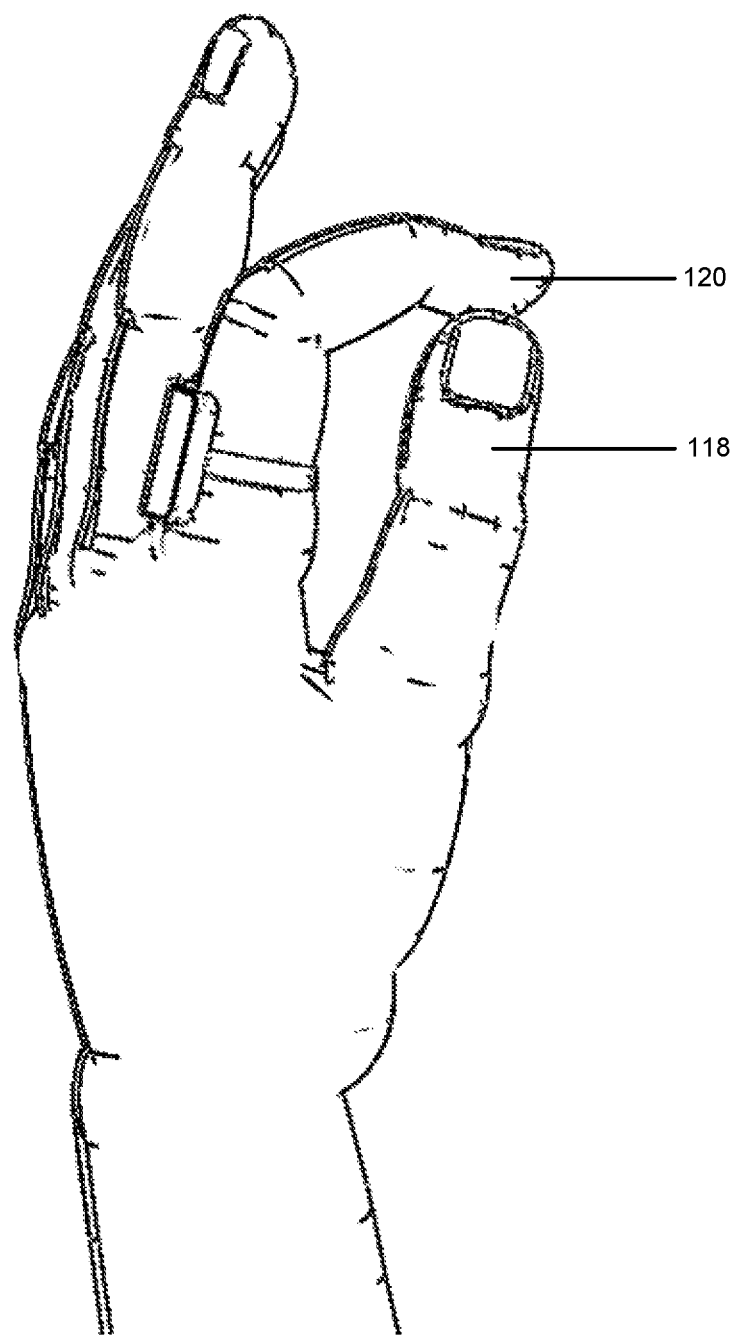

Referring now to FIG. 29A, FIG. 29B & FIG. 29C which illustrates different angles of fingertip interaction for motion only between Index finger and Thumb using the ring. As shown, in FIGS. 29A-29C, in an exemplary embodiment, the device/ring has the motion sensing unit integrated inside. The micro motions created on the index finger when the user's thumb touches and swipes/slides the fingertip of the index finger can be calibrated for the user and be considered as a valid input. The user may be asked to swipe the thumb over the tip of the index finger in different directions, each direction may correspond to a small fixed motion or acceleration on the index finger which can be sensed by the motion sensing unit inside the device. Since a swipe in a particular direction will create a similar pattern of motion in the index finger, the device senses this pattern and Machine learning algorithms can be used to fix this direction of motion as a particular input signal given by the user for interaction with the device.

Figure 29D:
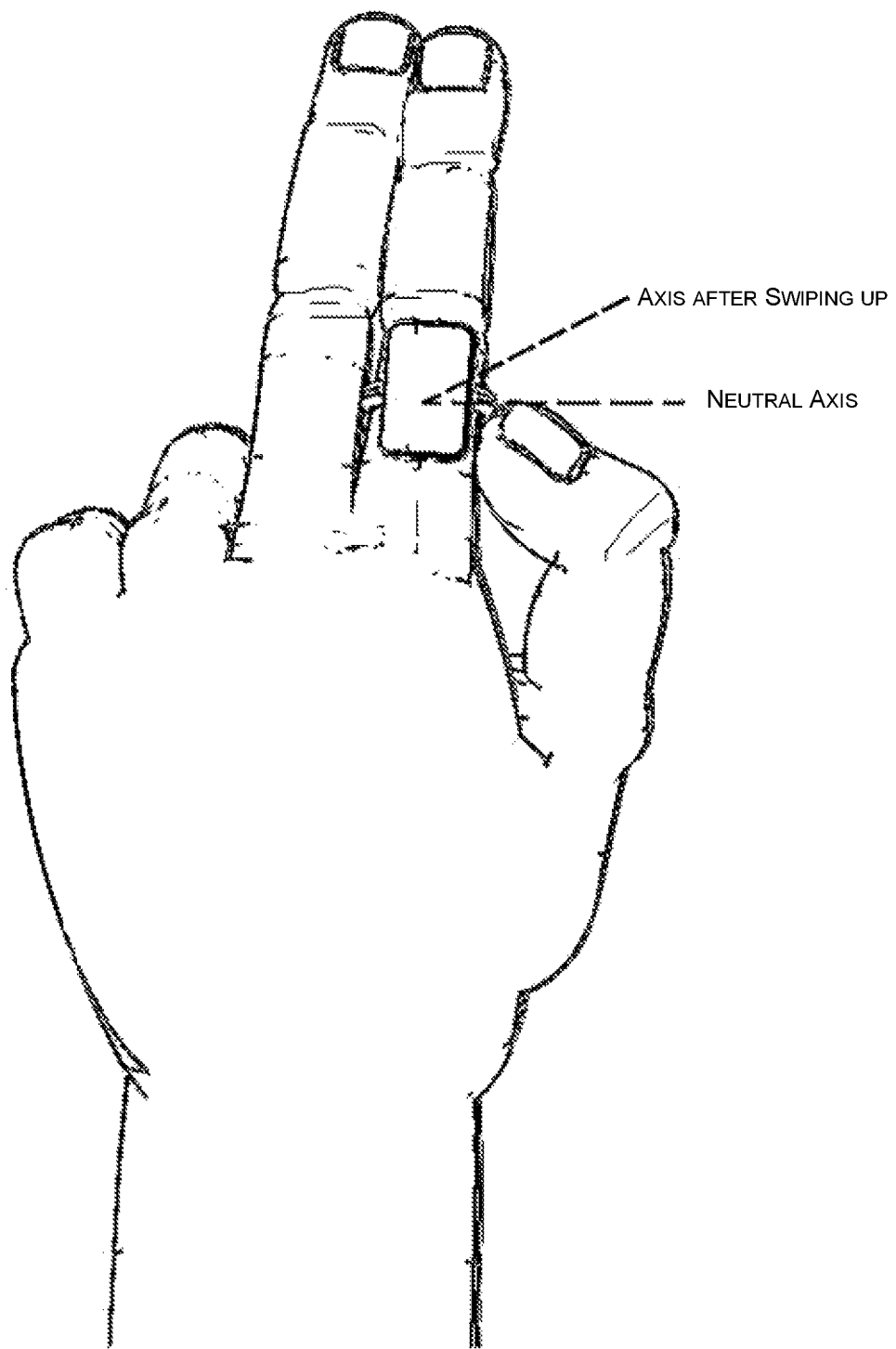

Referring now to FIG. 29D that illustrates swiping up and down on ring by thumb as an addition input interaction. As shown, in FIG. 29D, in an exemplary embodiment, In an exemplary embodiment where the device consists of a motion sensing unit, when the user swipes the thumb over this ring worn on the index finger, the ring experiences a certain force and a particular motion takes place in the ring for a particular direction of thumb swipe with respect to its initial position, this pattern of motion can be captured by a learning engine and the particular motion of the thumb over the ring can be considered as a specific input interaction for the device. For example, flicking the device worn in the index finger in a direction towards the fingertip by the user's thumb causes a deflection of the ring from "Neutral Axis" to "Axis after Swiping up" as shown in the drawing. This motion of the ring from neutral axis to new axis creates a specific pattern of data in the motion sensing unit. This pattern of data can be trained using a machine learning algorithm to indicate this flick of the thumb on the ring as a unique input interaction for the device.

In an exemplary implementation of the proposed embodiments in FIGS. 29A-29B, the display of the ring may be configured to provide various shortcuts or notifications about different applications running on the user's smartphones. This notification data may be communicated to the ring through Bluetooth from the smartphone. A machine learning algorithm running as a service in the smartphone would capture a few data points in the phone and predict the next shortcut user would need and this information of the predicted shortcut is relayed to the ring to be displayed on its screen (face or face edge). Multiple such shortcuts for different predicted actions can be displayed on the ring's display at once, each of these shortcuts are displayed in such a way that the direction of swiping the ring's touch interface in a particular direction would activate only the shortcut which is displayed on the display corresponding to that direction. A typical use case would be booking a cab to office instantly just when the user needs it. Here, machine learning algorithms in the phone learn user behavior with Cab booking applications and start predicting when the user wants to book a cab for what location. So, while having breakfast in the morning, this algorithm predicts that the user needs to book a cab to office in the next 15-20 minutes, this shortcut to book a cab to office is related to the ring wirelessly where the ring's processor shows thus shortcut on the ring's display. A right swipe on the ring's touch interface by the user would activate the shortcut and the cab gets booked whereas a left swipe on the touch interface would cancel the shortcut and next probable shortcut might be shown. This way, the user completes a regular task like booking a cab to office in a simple and effortless manner.

Use/Applications of Invention

The present invention "wearable ring-shaped electronic device" provides quickest/fastest way to call emergency services.

The present invention provides quickest way to control smart home gadgets, quickest way to book a cab, quickest way to call police, quickest way to make a phone call to any person (either through slider interface or voice commands), quickest way to access phone apps to activate/deactivate a specific service.

It may be appreciated that, the term quickest in the last paragraph refers to being the fastest when the speed of the referred tasks done are compared with the speed of the referred tasks being done by existing interfaces like Voice based interfaces and smartphone or smartwatch touchscreens.

The present invention construction avoids accidental activation of unwanted actions that happens commonly with simple touch based interfaces.

The present invention lets the user check notifications with ease as the display is positioned on a part of user's finger which remains mostly visible to the user at all times. For example, the user just can easily see the notifications displayed on the display while riding a motorbike, driving a car, typing, writing, cooking etc.

A more convenient way to use Voice commands outside home as compared to using it directly through smartphones.

The present invention is more convenient way to make phone calls as compared to holding phone in the hand and placing it near the ear, an easy way to get notified about important notifications in the phone, an easy way to control any wireless/wired device connected to a smartphone.

The present invention acts as the quickest and most efficient way to control regular tasks a person does using his/her smartphone. Here the term efficiency is used to indicate the energy used by the person to get the task done.

The present invention avoids unwanted shortcut activation by having only a sliding action giving a valid input to the device instead of a simple tap/touch input. Also, there is a switch on the ring that makes the touch slider interface inactive when turned off.

Those skilled in this technology can make various alterations and modifications without departing from the scope and spirit of the invention. Therefore, the scope of the invention shall be defined and protected by the following claims and their equivalents.

FIGS. 1-29 are merely representational and are not drawn to scale. Certain portions thereof may be exaggerated, while others may be minimized. FIGS. 1-29 illustrate various embodiments of the invention that can be understood and appropriately carried out by those of ordinary skill in the art.

In the foregoing detailed description of embodiments of the invention, various features are grouped together in a single embodiment for the purpose of streamlining the invention. This method of invention is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the detailed description of embodiments of the invention, with each claim standing on its own as a separate embodiment.

It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively.

I claim:

1. A wearable ring-shaped electronic device, comprising:
a ring portion engageable with a first finger of a user wearing the wearable ring-shaped electronic device, the ring portion comprising an interface; and
a display unit operatively coupled with the ring portion, the display unit comprising a face that is coupled with any or a combination of a face cover and a face edge such that, upon interaction between a second finger of the user and the interface, interaction-based data is transmitted to and processed by at least one processor of the wearable ring-shaped electronic device so as to enable one or more notifications to be either displayed on any or a combination of the face cover and the face edge, or audibly notified to the user, wherein a second processor, communicatively coupled with the at least one processor, predicts what the user is likely to do and assigns a corresponding function on the interface of the ring portion.

2. The wearable ring-shaped electronic device as claimed in claim 1, wherein the face is configured as casing of the display unit, and comprises any or a combination of a speaker, a microphone, a vibrational unit, a wireless antenna, a microcontroller, the at least one processor, and a power source.

3. The wearable ring-shaped electronic device as claimed in claim 1, wherein the face cover comprises a digital display screen to display at least a set of the one or more notifications.

4. The wearable ring-shaped electronic device as claimed in claim 1, wherein the interface is a touch slider interface that is operatively coupled with a touch sensor that senses movement of the second finger on the touch slider interface to generate a signal that is transmitted for processing to the at least one processor, and detect an action that is to be performed corresponding to the signal.

5. The wearable ring-shaped electronic device as claimed in claim 1, wherein the ring portion further comprises a sound control unit, which when actuated, enables the wearable ring-shaped electronic device to receive an audio signal from the user, and transmit the audio signal to the at least one processor to enable a set of the one or more notifications to be issued to any or a combination of the face cover and the face edge.

6. The wearable ring-shaped electronic device as claimed in claim 1, wherein a set of the one or more notifications comprise execution of a configured function.

7. The wearable ring-shaped electronic device as claimed in claim 1, wherein the at least one processor transmits the one or more notifications based on a combination of processing of the interaction-based data received from the interface, and user contextual parameters that are selected from any or a combination of time of the interaction, date of the interaction, manner of the interaction, user finger that is used as the second finger, history of calibration performed by the user for the interaction, location of the user during interaction, and frequency of the interaction.

8. The wearable ring-shaped electronic device as claimed in claim 7, wherein the wearable ring-shaped electronic device is operatively coupled with a learning engine operatively coupled with the at least one processor, the learning engine being configured to:
learn from any or a combination of interactions between the user and the one or more notifications displayed to the user, and user interactions on a mobile phone operatively coupled with the wearable ring-shaped electronic device; and relay feedback extracted from the learning to the at least one processor, based on which the at least one processor issues future notifications.

9. The wearable ring-shaped electronic device as claimed in claim 1, wherein the ring portion comprises a feedback projection to enable tactile feedback to be given to the user.

10. The wearable ring-shaped electronic device as claimed in claim 1, wherein the interaction-based data is generated based on any or a combination of vibrational and tactile feedback received from the user as part of the interaction.

11. The wearable ring-shaped electronic device as claimed in claim 1, wherein the face edge enables the user to perceive a set of the one or more notifications when users' hand is kept in relaxed position.

12. The wearable ring-shaped electronic device as claimed in claim 1, wherein the wearable ring-shaped electronic device is operatively coupled with a motion sensor, wherein when a motion of the ring portion takes place through an interaction between the first finger and a second finger by swiping the second finger on a portion of the first finger, the motion sensor senses direction and intensity of micro-motions of the ring portion, based on which at least a part of the interaction-based data is sent to the at least one processor.

13. The wearable ring-shaped electronic device as claimed in claim 1, wherein the wearable ring-shaped electronic device is operatively coupled with a motion sensor, wherein when a motion of the ring portion takes place by swiping thumb over the ring portion, the motion sensor senses direction and intensity of micro-motions of the ring portion, based on which at least a part of the interaction-based data is sent to the at least one processor.

14. The wearable ring-shaped electronic device as claimed in claim 1, wherein the interaction comprises sliding of the second finger over the interface.

15. The wearable ring-shaped electronic device as claimed in claim 1, wherein the at least one processor is operatively coupled with the second processor in a manner such that at least a part of the interaction-based data is processed at the second processor so as to enable generation of the one or more notifications.

16. The wearable ring-shaped electronic device as claimed in claim 15, wherein the second processor is configured in a mobile phone.

17. The wearable ring-shaped electronic device as claimed in claim 15, wherein the second processor is a remote processor configured in cloud.

18. The wearable ring-shaped electronic device as claimed in claim 1, wherein the face cover makes a curve at one edge of the face, the curve being representative of the face edge.

19. The wearable ring-shaped electronic device as claimed in claim 1, wherein the face edge is used to display a portion of the one or more notifications.

20. The wearable ring-shaped electronic device as claimed in claim 1, wherein the interface is a planar joystick, the planar joystick comprising one or more of slider buttons, each of the one or more slider buttons, upon being actuated and interacted with, generate at least a portion of the interaction-based data.

21. The wearable ring-shaped electronic device as claimed in claim 20, wherein the one or more slider buttons interact and operate with a first magnet and a second magnet and at least one lock so as to actuate the respective slider button and enable generation of the at least portion of the interaction-based data, wherein the first magnet is enclosed by the slider button and configured to perform sliding motion with respect to the second magnet.

22. The wearable ring-shaped electronic device as claimed in claim 20, wherein actuation of the plurality of slider buttons is performed through physical displacement of the respective slider button.

23. The wearable ring-shaped electronic device as claimed in claim 20, wherein the mechanical slider interface further comprises at least one magnetic sensor operatively coupled with the one or more magnets so as to generate and transmit the at least portion of the interaction-based data to the at least one processed based on orientation of the one or more magnets.

24. The wearable ring-shaped electronic device as claimed in claim 1, wherein the face is the display unit, and wherein the ring portion comprises any or a combination of a speaker, a microphone, a vibrational unit, a wireless antenna, a microcontroller, the at least one processor, and a power source.

25. The wearable ring-shaped electronic device as claimed in claim 1, wherein the interface is configured to control one or more electronic devices.

* * * * *